US012700903B2

(12) United States Patent
Nilsson et al.

(10) Patent No.: US 12,700,903 B2
(45) Date of Patent: Aug. 4, 2026

(54) FRAMEWORK AND SIGNALING FOR DYNAMIC NONCOHERENT JOINT TRANSMISSION (NC-JT) CHANNEL STATE INFORMATION (CSI) HYPOTHESIS INDICATION

(71) Applicant: Telefonaktiebolaget LM Ericsson (publ), Stockholm (SE)

(72) Inventors: Andreas Nilsson, Gothenburg (SE); Helka-Liina Määttänen, Espoo (FI); Shiwei Gao, Nepean (CA); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 320 days.

(21) Appl. No.: 18/554,086

(22) PCT Filed: Mar. 31, 2022

(86) PCT No.: PCT/IB2022/053041
§ 371 (c)(1),
(2) Date: Oct. 5, 2023

(87) PCT Pub. No.: WO2022/214925
PCT Pub. Date: Oct. 13, 2022

(65) Prior Publication Data
US 2024/0372589 A1     Nov. 7, 2024

Related U.S. Application Data

(60) Provisional application No. 63/171,436, filed on Apr. 6, 2021.

(51) Int. Cl.
*H04B 7/02* (2018.01)
*H04B 7/06* (2006.01)
*H04L 5/00* (2006.01)

(52) U.S. Cl.
CPC ......... *H04B 7/0626* (2013.01); *H04L 5/0094* (2013.01)

(58) Field of Classification Search
CPC ...... H04B 7/022; H04B 7/024; H04B 7/0626; H04B 7/0628; H04B 7/063; H04L 1/0026;
(Continued)

(56) References Cited

U.S. PATENT DOCUMENTS 10,367,566 B2 * 7/2019 Sun .......................... H04L 5/003
10,631,329 B2 * 4/2020 Sun ........................ H04W 72/23
(Continued)

OTHER PUBLICATIONS

Moderator (Huawei, HiSilicon), Summary of CSI enhancements for MTRP and FDD (Round 1), 3GPP TSG RAN WG1 Meeting #104-e E-meeting, R1-210xxxx, 12 pages, Jan. 25 to Feb. 5, 2021.*
(Continued)

*Primary Examiner* — Frank Duong
(74) *Attorney, Agent, or Firm* — Weisberg I.P. Law, P.A.

(57) ABSTRACT

A method, network node and wireless device (WD) for dynamic non-coherent joint transmission channel state information (CSI) indication are disclosed. According to one aspect, a method in a network node includes transmitting a first indication of a set of channel measurement resources (CMRs) for CSI. The CSI includes at least one of: a first CSI for multiple transmission and reception point (multi-TRP) physical downlink shared channel (PDSCH) transmission, and at least one second CSI for PDSCH transmission from one TRP. The method includes transmitting a second indication of a first subset of the set of CMRs to use for determining the first CSI. The method includes configuring the WD to use a second subset of the set of CMRs for determining the at least one second CSI, and receiving a CSI report comprising at least one of the first CSI and the at least one second CSI.

20 Claims, 13 Drawing Sheets

(58) Field of Classification Search

CPC ... H04L 5/0035; H04L 5/0053; H04L 5/0057;
H04L 5/0094; H04W 24/10; H04W 72/23

See application file for complete search history.

(56) References Cited

U.S. PATENT DOCUMENTS

| | | | | |
|---|---|---|---|---|
| 12,021,588 | B2 * | 6/2024 | Mondal ................ | H04B 7/0639 |
| 2020/0373985 | A1 * | 11/2020 | Tsai ...................... | H04W 24/10 |
| 2021/0028843 | A1 | 1/2021 | Zhou et al. | |
| 2023/0046218 | A1 * | 2/2023 | Matsumura .......... | H04B 7/0626 |
| 2023/0084460 | A1 * | 3/2023 | Gao ...................... | H04L 5/0057 |
| | | | | 370/252 |
| 2024/0072867 | A1 * | 2/2024 | Shao ..................... | H04L 5/0094 |
| 2024/0088967 | A1 * | 3/2024 | Gao ....................... | H04B 7/024 |
| 2024/0089773 | A1 * | 3/2024 | Matsumura ........... | H04W 72/04 |
| 2024/0250727 | A1 * | 7/2024 | Muruganathan ....... | H04B 7/065 |

OTHER PUBLICATIONS

Interdigital, Inc., CSI Enhancements for the Support of NCJT MTRP, 3GPP TSG RAN WG1 Meeting #104-e E-meeting, R1-2100069, 5 pages, Jan. 25 to Feb. 5, 2021.*

Japanese Office Action dated Oct. 15, 2024 and English language translation of the Japanese Office Action issued in Japanese Application No. 2023-561279, consisting of 10 pages.

GPP TSG RAN WG1 Meeting #104-e; R1-2101011; Source; Nokia, Nokia Shanghai Bell; Title: Enhancement on CSI measurement and reporting; Agenda Item: 8.1.4; Document for: Discussion and Decision; e-Meeting, Jan. 25-Feb. 5, 2021, consisting of 21 pages.

3GPP TSG RAN WG1 Meeting #104-e; R1-2102062; Source: Moderator (Huawei, HiSilicon); Title: Summary of CSI enhancements for MTRP and FDD (Round 4); Agenda Item: 8.1.4; Document for: Discussion and Decision; E-meeting, Jan. 25-Feb. 5, 2021, consisting of 30 pages.

International Search Report and Written Opinion dated Jul. 1, 2022 issued in PCT Application No. PCT/IB2022/053041 filed Mar. 31, 2022, consisting of 15 pages.

Written Opinion of the International Preliminary Examining Authority issued in PCT Application No. PCT/IB2022/053041 filed Mar. 31, 2022, consisting of 5 pages.

International Preliminary Report on Patentability issued in PCT Application No. PCT/IB2022/053041 filed Mar. 31, 2022, consisting of 23 pages.

3GPP TSG RAN WG1 Meeting #104-e; R1-2101884; Title: Summary of CSI Enhancements for MTRP and FDD (Round 0); Source: Moderator (Huawei, HiSilicon); Agenda Item: 8.1.4; Document for: Discussion and Decision; E-meeting, Jan. 25-Feb. 5, 2021, consisting of 48 pages.

3GPP TS 38.101-1 V17.0.0 (Dec. 2020) 3rd Generation Partnership Project; Technical Specification Group Radio Access Network; NR; User Equipment (UE) radio transmission and reception; Part 1: Range 1 Standalone (Release 17), consisting of 488 pages.

3GPP TS 38.321 V16.3.0 (Dec. 2020) 3rd Generation Partnership Project; Technical Specification Group Radio Access Network; NR; Medium Access Control (MAC) protocol specification (Release 16), consisting of 156 pages.

3GPP TSG RAN WG1 #103-e; R1-2008901; Title: CSI Enhancements on Type II PS Codebook and Multi-TRP; Source: Fraunhofer IIS, Fraunhofer HHI; Agenda item: 8.1.4; Document for: Decision; e-Meeting, Oct. 26-Nov. 13, 2020, consisting of 11 pages.

3GPP TSG RAN WG1 #104-e; R1-2100954; Title: Discussion on CSI enhancement for multi-TRP transmission; Source: NEC; Agenda Item: 8.1.4; Document for: Discussion and Decision; e-Meeting, Jan. 25-Feb. 5, 2021, consisting of 4 pages.

3GPP TS 38.214 V16.4.0 (Dec. 2020) 3rd Generation Partnership Project; Technical Specification Group Radio Access Network; NR; Physical layer procedures for data (Release 16), consisting of 169 pages.

3GPP TS 38.331 V16.3.1 (Jan. 2021) 3rd Generation Partnership Project; Technical Specification Group Radio Access Network; NR; Radio Resource Control (RRC) protocol specification (Release 16), consisting of 932 pages.

3GPP TS 38.101-2 V17.0.0 (Dec. 2020) 3rd Generation Partnership Project; Technical Specification Group Radio Access Network; NR; User Equipment (UE) radio transmission and reception; Part 2: Range 2 Standalone (Release 17), consisting of 180 pages.

* cited by examiner

| sTRP AND NCJT MEASUREMENT HYPOTHESISES | TRP1 | TRP2 | TRP3 | TRP4 |
|---|---|---|---|---|
| #1 | X | | | |
| #2 | | X | | |
| #3 | | | X | |
| #4 | | | | X |
| #5 | X | X | | |
| #6 | X | | X | |
| #7 | X | | | X |
| #8 | | X | X | |
| #9 | | X | | X |
| #10 | | | X | X |

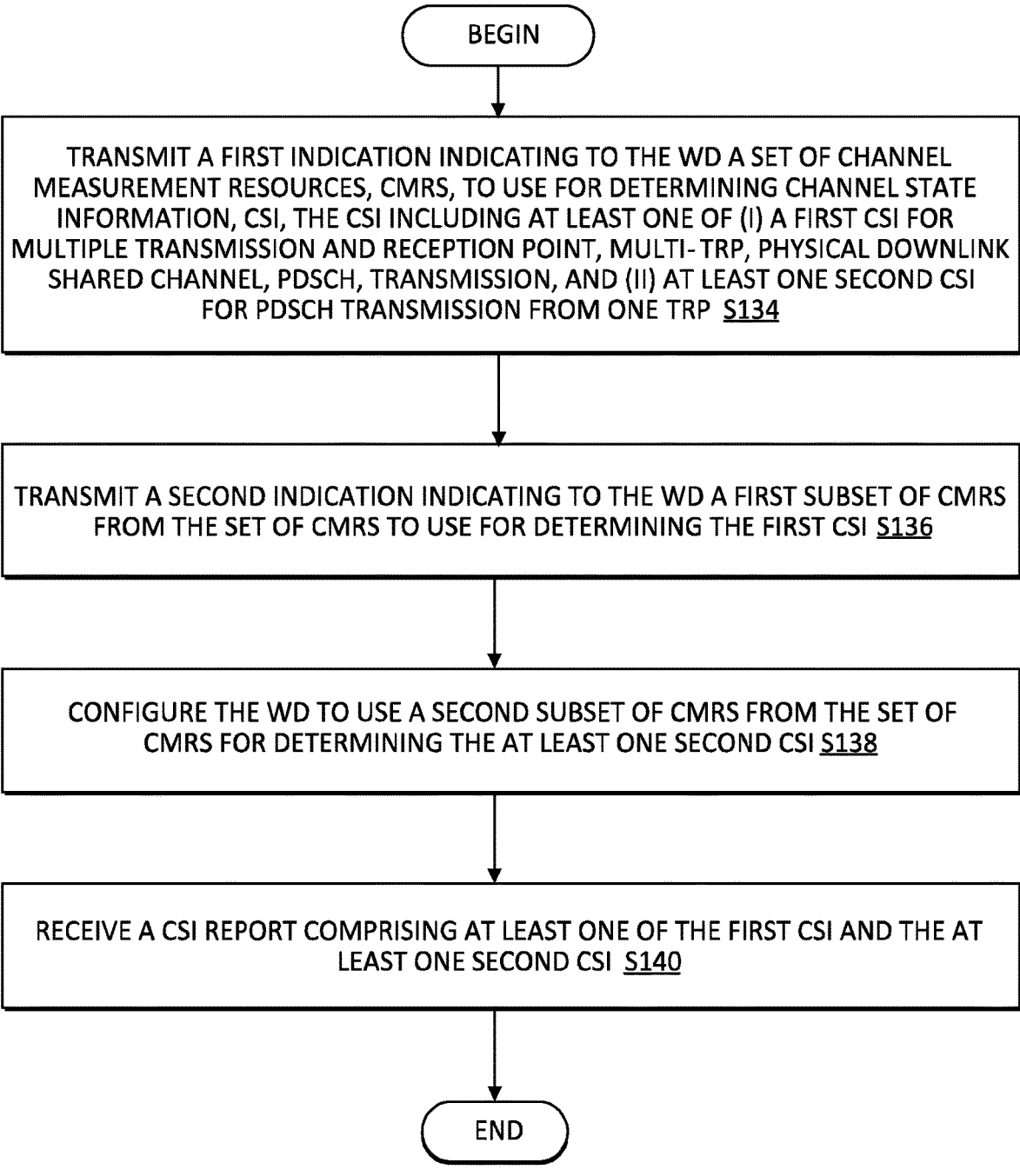

BEGIN

TRANSMIT A FIRST INDICATION INDICATING TO THE WD A SET OF CHANNEL MEASUREMENT RESOURCES, CMRS, TO USE FOR DETERMINING CHANNEL STATE INFORMATION, CSI, THE CSI INCLUDING AT LEAST ONE OF (I) A FIRST CSI FOR MULTIPLE TRANSMISSION AND RECEPTION POINT, MULTI-TRP, PHYSICAL DOWNLINK SHARED CHANNEL, PDSCH, TRANSMISSION, AND (II) AT LEAST ONE SECOND CSI FOR PDSCH TRANSMISSION FROM ONE TRP S134

TRANSMIT A SECOND INDICATION INDICATING TO THE WD A FIRST SUBSET OF CMRS FROM THE SET OF CMRS TO USE FOR DETERMINING THE FIRST CSI S136

CONFIGURE THE WD TO USE A SECOND SUBSET OF CMRS FROM THE SET OF CMRS FOR DETERMINING THE AT LEAST ONE SECOND CSI S138

RECEIVE A CSI REPORT COMPRISING AT LEAST ONE OF THE FIRST CSI AND THE AT LEAST ONE SECOND CSI S140

END

FIG. 11

CSI-RS RESOURCE SET WITH CMR

| CMR GROUP 0 | CMR GROUP 1 |
|---|---|
| − CMR1<br>   − CSI-RS RESOURCE ID 1<br>− CMR2<br>   − CSI-RS RESOURCE ID 2<br>− CMR3<br>   − CSI-RS RESOURCE ID 3 | − CMR4<br>   − CSI-RS RESOURCE ID 4<br>− CMR5<br>   − CSI-RS RESOURCE ID 5 |

NCJT-CMR-PAIRING-BITFIELD-R17: (X1 X2 X3 X4 X5 X6)

NCJT MEASURMENT HYPOTHESIS

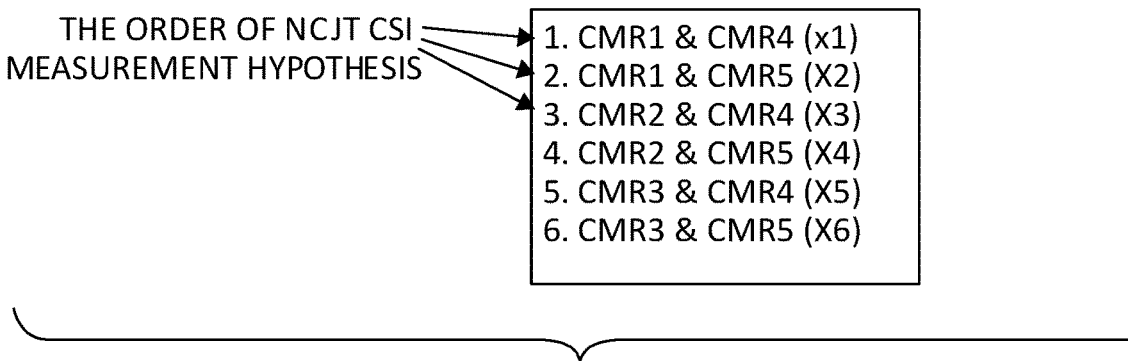

THE ORDER OF NCJT CSI
MEASUREMENT HYPOTHESIS

1. CMR1 & CMR4 (x1)
2. CMR1 & CMR5 (X2)
3. CMR2 & CMR4 (X3)
4. CMR2 & CMR5 (X4)
5. CMR3 & CMR4 (X5)
6. CMR3 & CMR5 (X6)

FIG. 13

CSI-RS RESOURCE SET WITH CMR

| CMR GROUP 0 | CMR GROUP 1 |
|---|---|
| − CMR1<br>   − CSI-RS RESOURCE ID 1<br>− CMR2<br>   − CSI-RS RESOURCE ID 2<br>− CMR3<br>   − CSI-RS RESOURCE ID 3 | − CMR4<br>   − CSI-RS RESOURCE ID 4<br>− CMR5<br>   − CSI-RS RESOURCE ID 5 |

NCJT MEASURMENT HYPOTHESIS    CODEPOINT OF

THE ORDER OF NCJT CSI MEASUREMENT HYPOTHESIS

NCJT-CMR-PAIRING-R17

1. CMR1 & CMR4 (1)
2. CMR1 & CMR5 (2)
3. CMR2 & CMR4 (3)
4. CMR2 & CMR5 (4)
5. CMR3 & CMR4 (5)
6. CMR3 & CMR5 (6)

CSI-RS RESOURCE SET WITH CMR

| CMR GROUP 0 | CMR GROUP 1 |
|---|---|
| − CMR1<br>   − CSI-RS RESOURCE ID 1<br>− CMR2<br>   − CSI-RS RESOURCE ID 2<br>− CMR3<br>   − CSI-RS RESOURCE ID 3 | − CMR4<br>   − CSI-RS RESOURCE ID 4<br>− CMR5<br>   − CSI-RS RESOURCE ID 5 |

THE ORDER OF NCJT CSI MEASUREMENT HYPOTHESIS

NCJT MEASURMENT HYPOTHESIS

1. CMR1 & CMR4 (1)
2. CMR1 & CMR5 (2)
3. CMR2 & CMR4 (3)
4. CMR2 & CMR5 (4)
5. CMR3 & CMR4 (5)
6. CMR3 & CMR5 (6)

CODEPOINT OF NCJT-CMR-PAIRING-R17

CSI-RS RESOURCE SET WITH CMR

| CMR GROUP 0 | CMR GROUP 1 |
|---|---|
| − CMR1<br>  − CSI-RS RESOURCE ID 1<br>− CMR2<br>  − CSI-RS RESOURCE ID 2<br>− CMR3<br>  − CSI-RS RESOURCE ID 3 | − CMR4<br>  − CSI-RS RESOURCE ID 4<br>− CMR5<br>  − CSI-RS RESOURCE ID 5 |

NCJT MEASURMENT HYPOTHESIS

THE ORDER OF NCJT CSI MEASUREMENT HYPOTHESIS

CODEPOINT OF NCJT-CMR-PAIRING-R17

1. CMR1 & CMR4 (1)
2. CMR1 & CMR5 (2)
3. CMR2 & CMR4 (3)
4. CMR2 & CMR5 (4)
5. CMR3 & CMR4 (5)
6. CMR3 & CMR5 (6)

FRAMEWORK AND SIGNALING FOR DYNAMIC NONCOHERENT JOINT TRANSMISSION (NC-JT) CHANNEL STATE INFORMATION (CSI) HYPOTHESIS INDICATION

CROSS-REFERENCE TO RELATED APPLICATIONS

This application is a Submission Under 35 U.S.C. § 371 for U.S. National Stage Patent Application of International Application No.: PCT/IB2022/053041, filed Mar. 31, 2022 entitled "FRAMEWORK AND SIGNALING FOR DYNAMIC NONCOHERENT JOINT TRANSMISSION (NC-JT) CHANNEL STATE INFORMATION (CSI) HYPOTHESIS INDICATION," which claims priority to U.S. Provisional Application No.: 63/171436, filed Apr. 6, 2021, entitled "FRAMEWORK AND SIGNALING FOR DYNAMIC NC-JT CSI HYPOTHESIS INDICATION," the entireties of both of which are incorporated herein by reference.

FIELD

The present disclosure relates to wireless communications, and in particular, to framework and signaling for dynamic non-coherent joint transmission (NC-JT) channel state information (CSI) hypothesis indication.

BACKGROUND

Long Term Evolution (LTE) and New Radio (NR) support multiple input multiple output (MIMO) antenna deployments and MIMO related techniques. Spatial multiplexing is one of the MIMO techniques used to achieve high data rates in favorable channel conditions.

For an antenna array with $N_T$ antenna ports at the network node for transmitting r DL symbols $s=[s_1, s_2, \ldots, s_r]^T$, the received signal at a wireless device (WD) with $N_R$ receive antennas at a certain RE n can be expressed as:

$$y_n = H_n Ws + e_n$$

where $y_n$ is a $N_R \times 1$ received signal vector; $H_n$ a $N_R \times N_T$ channel matrix at the RE between the network node and the WD; W is an $N_T \times r$ precoder matrix; $e_n$ is a $N_R \times 1$ noise plus interference vector received at the RE by the WD. The precoder W can be a wideband precoder, i.e., constant over a whole bandwidth part (BWP), or a subband precoder, i.e., constant over each subband.

The precoder matrix is typically selected from a codebook of possible precoder matrices, and typically reported by a precoder matrix indicator (PMI), which specifies a unique precoder matrix in the codebook for a given number of symbol streams. Each of the r symbols in s corresponds to a spatial layer. The number r is referred to as the rank of the channel and is reported by a rank indicator (RI).

For a given block error rate (BLER), a modulation level and coding scheme (MCS) is determined by a WD based on the observed signal to noise and interference ratio (SINR), which is reported by a channel quality indicator (CQI). NR supports transmission of either one or two transport blocks (TBs) to a WD in a slot, depending on the rank. One TB is used for ranks 1 to 4, and two TBs are used for ranks 5 to 8. A CQI is associated to each TB. The CQI/RI/PMI report can be either wideband or subband based on the configuration.

Rank indicator (RI), precoder matrix indicator (PMI), and channel quality indicator (CQI) are part of channel state information (CSI) and reported by a WD to a network node.

A CSI-RS is transmitted on each transmit antenna port and is used by a WD to measure downlink channel associated with each of antenna ports. The antenna ports are also referred to as CSI-RS ports. The supported number of antenna ports in NR are {1, 2, 4, 8, 12, 16, 24, 32}. By measuring the received CSI-RS, a WD can estimate the channel the CSI-RS is traversing, including the radio propagation channel and antenna gains. CSI-RS for this purpose is also referred to as Non-Zero Power (NZP) CSI-RS. NZP CSI-RS can be configured to be transmitted in certain REs per PRB. FIG. 1 shows an example of a NZP CSI-RS resource configuration with 4 CSI-RS ports in a PRB in one slot.

In addition to NZP CSI-RS, Zero Power (ZP) CSI-RS was defined in NR to indicate to a WD that the associated REs are not available for PDSCH scheduling at the network node. ZP CSI-RS can have the same RE patterns as NZP CSI-RS.

CSI resource for interference measurement, CSI-IM, is also defined in NR for a WD to measure noise and interference, typically from other cells. CSI-IM includes 4 REs in a slot. Two different CSI-IM patterns are defined: The CSI-IM pattern can be either 4 consecutive REs in one OFDM symbol or two consecutive REs in both frequency and time domains. An example is shown in FIG. 1. Typically, the network node does not transmit any signal in the CSI-IM resource so that what is observed in the resource is noise and interference from other cells.

CSI Framework in NR

In NR, a WD can be configured with one or multiple CSI report configurations. Each CSI report configuration (defined by a higher layer information element (IE) CSI-ReportConfig) is associated with a BWP and may include one or more of:

a CSI resource configuration for channel measurement;
a CSI-IM resource configuration for interference measurement;
a NZP CSI-RS resource for interference measurement;
reporting type, i.e., aperiodic CSI (on PUSCH), periodic CSI (on PUCCH) or semi-persistent CSI (on PUCCH, and DCI activated on PUSCH);
report quantity specifying what to be reported, such as RI, PMI, CQI;
codebook configuration such as type I or type II CSI; and/or,
frequency domain configuration, i.e., subband vs. wideband CQI or PMI, and subband size.

The CSI-ReportConfig information element (IE) is provided in 3GPP Technical Standard (TS) 38.331.

A WD can be configured with one or multiple CSI resource configurations each with a CSI-ResourceConfigId, for channel and interference measurement. Each CSI resource configuration for channel measurement or for NZP CSI-RS based interference measurement can contain one or more NZP CSI-RS resource sets. Each NZP CSI-RS resource set can further contain one or more NZP CSI-RS resources. A NZP CSI-RS resource can be periodic, semi-persistent, or aperiodic.

Similarly, each CSI-IM resource configuration for interference measurement can contain one or more CSI-IM resource sets. Each CSI-IM resource set can further contain one or more CSI-IM resources. A CSI-IM resource can be periodic, semi-persistent, or aperiodic.

Periodic CSI starts after it has been configured by RRC and is reported on PUCCH. The associated NZP CSI-RS resource(s) and CSI-IM resource(s) are also periodic.

For semi-persistent CSI, it can be either on PUCCH or PUSCH. Semi-persistent CSI on PUCCH is activated or deactivated by a medium access control control element (MAC CE) command. Semi-persistent CSI on PUSCH is activated or deactivated by DCI. The associated NZP CSI-RS resource(s) and CSI-IM resource(s) can be either periodic or semi-persistent.

Aperiodic CSI is reported on PUSCH and is activated by a CSI request bit field in DCI. The associated NZP CSI-RS resource(s) and CSI-IM resource(s) can be either periodic, semi-persistent, or aperiodic. The linkage between a code point of the CSI request field and a CSI report configuration is via an aperiodic CSI trigger state. A WD is configured by higher layer with a list of aperiodic CSI trigger states, where each of the trigger states contains an associated CSI report configuration. The CSI request field is used to indicate one of the aperiodic CSI trigger states and thus, one CSI report configuration.

If there are more than one NZP CSI-RS resource set and/or more than one CSI-IM resource set associated with a CSI report configuration, only one NZP CSI-RS resource set and one CSI-IM resource set are selected in the aperiodic CSI trigger state. Thus, each aperiodic CSI report is based on a single NZP CSI-RS resource set and a single CSI-IM resource set.

In case multiple NZP CSI-RS resources are configured in a NZP CSI-RS resource set for channel measurement, the WD would select one NZP CSI-RS resource and report a CSI associated with the selected NZP CSI-RS resource. A CRI (CSI-RS resource indicator) would be reported as part of the CSI. In this case, the same number of CSI-IM resources, each paired with a NZP CSI-RS resource, should be configured in the associated CSI-IM resource set. That is, when a WD reports a CRI value k, this corresponds to the (k+1)th entry of the NZP CSI-RS resource set for channel measurement, and, if configured, the (k+1)th entry of the CSI-IM resource set for interference measurement (see clause 5.2.1.4.2 of 3GPP TS 38.214).

When NZP CSI-RS resource(s) are configured for interference measurement in a CSI-ReportConfig, only a single NZP-CSI-RS resource in a CSI-RS resource set can be configured for channel measurement in the same CSI-ReportConfig.

Since the TRPs may be in different physical locations, the propagation channels to the WD can also be different. Different antennas or transmit beams are used in different TRPs. At the WD side, different receive antennas or receive beams may be used to receive from different TRPs. To facilitate receiving PDSCH from different TRPs, TCI (transmission configuration indicator) states were introduced in 3GPP NR Release 15 (3GPP NR Rel-15). A TCI state contains Quasi Co-location (QCL) information between a Demodulation Reference Signal (DMRS) for PDCCH or PDSCH and one or two DL reference signals such as a CSI-RS or a SSB. The supported QCL information types in NR are:

'QCL-TypeA': {Doppler shift, Doppler spread, average delay, delay spread};

'QCL-TypeB': {Doppler shift, Doppler spread};

'QCL-TypeC': {Doppler shift, average delay}; and

'QCL-TypeD': {Spatial Rx parameter}.

The QCL information is used by a WD to apply one or more channel properties estimated from the DL reference signals (CSI-RS or SSB) to channel estimation based on the DMRS for the PDSCH or PDCCH reception. For example, channel delay spread and Doppler shift parameters can be estimated from the QCL source RS, the estimation is then used for determining the channel filtering parameters for channel estimation based on the DMRS.

In 3GPP NR Rel-15, only PDSCH transmission from a single TRP is supported, in which a WD receives PDSCH from a single TRP at any given time.

In 3GPP NR Rel-16, PDSCH transmission over multiple TRPs was introduced. One of the multi-TRP schemes is NC-JT, in which a PDSCH to a WD in transmitted over two TRPs with different MIMO layers of the PDSCH transmitted from different TRPs. For example, 2 layers can be transmitted from a first TRP and 1 layer can be transmitted from a second TRP.

NC-JT refers to MIMO data transmission over multiple TRPs in which different MIMO layers are sent over different TRPs. An example is shown in FIG. 2 where a PDSCH is sent to a WD over two TRPs, each carrying one code word. When the WD has 4 receive antennas while each of the TRPs has only 2 transmit antennas, the WD can support up to 4 MIMO layers but there are a maximum of 2 MIMO layers from each TRP. In this case, by transmitting data over two TRPs to the WD, the peak data rate to the WD can be increased as up to 4 aggregated layers from the two TRPs can be used. This may be beneficial when the traffic load and thus the resource utilization, is low in each TRP. The scheme can also be beneficial in the case where the WD is in line of sight (LOS) of both the TRPs and the rank per TRP is limited even when there are more transmit antennas available at each TRP.

This type of NC-JT is supported in LTE with two TRPs, each up to 8 antenna ports. For CSI feedback purpose, a WD is configured with a CSI process with two NZP CSI-RS resources, one for each TRP, and one interference measurement resource. The WD may report one of the following example scenarios:

1. A WD reports CRI=0, which indicate that CSI is calculated and reported only for the first NZP CSI-RS resource, i.e., a RI, a PMI and a CQI associated with the first NZP CSI-RS resource is reported. This is the case when the WD sees best throughput is achieved by transmitting a PDSCH over the TRP or beam associated with the first NZP CSI-RS resource.

A WD reports CRI=1, which indicate that only CSI is calculated and reported for the second NZP CSI-RS resource, i.e., a RI, a PMI and a CQI associated with the second NZP CSI-RS resource is reported. This is the case when the WD sees best throughput is achieved by transmitting a PDSCH over the TRP or beam associated with the second NZP CSI-RS resource.

2. A WD reports CRI=2, which indicate both of the two NZP CSI-RS resources. In this case, two set of CSIs, each for one CW, are calculated and reported based on the two NZP CSI-RS resources and by considering inter-CW interference caused by the other CW. The combinations of reported RIs are restricted such that $|RI1-RI2|<=1$, where RI1 and RI2 correspond to ranks associated with the 1st and the 2nd NXP CSI-RS, respectively.

In 3GPP NR Rel-16, a different approach is adopted where a single CW is transmitted across two TRPs. An example is shown in FIG. 3, where one layer is transmitted from each of two TRPs.

Two types of NC-JT are supported, i.e., single DCI based N-JT and multi-DCI based NC-JT. In single DCI based NC-JT, it is assumed that a single scheduler is used to schedule data transmission over multiple TRPs. Different layers of a single PDSCH scheduled by a single PDCCH can be transmitted from different TRPs.

In multi-DCI based NC-JT, independent schedulers are assumed in different TRPs to schedule PDSCHs to a WD. Two PDSCHs scheduled from two TRPs may be fully or partially overlapped in time and frequency resource. Only semi-static coordination between TRPs may be possible.

For CSI measurement associated to a reporting setting CSI-ReportConfig for NC-JT, there will be:

Ks≥2 NZP CSI-RS resources in a CSI-RS resource set for channel measurement; the Ks resources will be referred to as channel measurement resources (CMR); and N≥1 NZP CSI-RS resource pairs for NC-JT CSI whereas each pair is used for a NC-JT CSI measurement hypothesis.

In addition, the agreement states that the Ks≥2 NZP CSI-RS resources in the CSI-RS resource set for CMR can be divided in to two different CMR groups, and that each of the N pairs used for NC-JT CSI measurement hypothesis could be associated with one CMR from each of the two CMR groups.

In addition, the agreement states that higher-layer signaling can be used to configure the N CMR pairs, however, how this signaling is performed is for further study (FFS).

For CSI measurement associated to a reporting setting CSI-ReportConfig for NCJT, the WD can be configured with Ks≥2 NZP CSI-RS resources in a CSI-RS resource set for CMR and N≥1 NZP CSI-RS resource pairs, whereas each resource pair is used for a NCJT measurement hypothesis:

Configure WD with two CMR groups with Ks=K1+K2 CMRs. CMR pairs are determined from two CMR groups by following method(s).

a) K1 and K2 are the number of CMRs in two groups respectively. K1=K2 or different K1/K2 are to be considered in future study;

b) Note that CMRs in each CMR group can be used for both NCJT and Single-TRP measurement hypotheses;

c) N CMR pairs are higher-layer configured by selecting from all possible pairs:

i) signaling mechanism can be discussed further, e.g., using a bitmap;

ii) Considered for future study: Whether MAC-CE or RRC+MAC CE indication is needed;

iii) Considered for future study: how to support NCJT measurement hypotheses in FR2;

d) Support N=1 and Ks=2, FFS other maximal values of N>1 and Ks>2;

Note: for CPU/resource/port occupation, NCJT hypothesis is considered separately from single TRP hypothesis.

To support dynamic switching between single TRP transmission and NC-JT transmission over coordination clusters of multiple TRPs in a suitable way, the WD should preferably evaluate both multiple single-TRP measurement hypothesis and multiple NC-JT CSI measurement hypothesis (and then report one or more CSIs corresponding to the measurement hypothesis associated with best performance). The number of possible measurement hypothesis quickly increases with increasing coordination cluster size. One example of this is illustrated in FIG. 4, where 4 TRPs are included in the coordination cluster, and where the possible number of measurement hypothesis may be as many as ten (considering a limit of maximum two TRPs per NC-JT CSI measurement hypothesis), which compared to a coordination cluster of two TRPs requires only three measurement hypothesis.

Due to a limited number of CPUs (CSI processing units as defined in 3GPP Technical Standard (TS) 38.214) available for CSI calculation in commercial WDs, it might not be possible for a WD to calculate all the possible measurement hypothesis for a coordination cluster sizes of e.g. 3 or more TRPs. Also, in some case, the network might be aware that one or a subset of the TRPs of a coordination cluster is unavailable (due to, for example, high load for that TRP, or too high path loss). In this case it is a waste of WD processing capability and causes heat generation at the WD to let the WD calculate measurement hypothesis related to an unavailable TRP. In addition, if a certain TRP is unavailable, and the WD e.g., is configured to only report the best out of all the evaluated NC-JT hypothesis, there is a risk that the reported NC-JT hypothesis includes the unavailable TRP, which might make the NC-JT CSI report useless.

Therefore, how a network node indicates the CMRs to be used for NC-JT CSI and single-TRP CSI is an open question. Although the agreement from RAN1 #104-e mentions that N CMR pairs can be higher layer configured, the detailed signaling mechanism for indicating the CMRs to be used for NC-JT CSI and single-TRP CSIs is still to be solved.

SUMMARY

Some embodiments advantageously provide methods, systems, and apparatuses for framework and signaling for dynamic NC-JT CSI hypothesis indication.

Some embodiments provide a framework and signaling for dynamically indicating the single-TRP/NC-JT CSI measurement hypothesis a WD should consider during NC-JT CSI calculations.

Some embodiments may perform at least some of the following:

Configuring different CMR pairs corresponding to different NC-JT CSI measurement hypothesis as part of CSI reporting configuration or CSI-AssociatedReportConfig configuration;

dynamically indicating to the WD different CMR pairs (i.e., different NC-JT CSI measurement hypothesis) via DCI or MAC CE; and signaling details on which CMR resources the WD can use for NC-JT CSI hypothesis and which CMR resources the WD can use for single-TRP hypothesis.

By dynamically changing the NC-JT CSI measurement hypothesis for a WD, the network can in a flexible way adapt which TRPs the WD should calculate single-TRP/NC-JT CSI for, and in that way improve the flexibility and performance in the system.

In addition, by indicating which CMRs the WD should use for single-TRP measurement hypotheses and which CMRs should be used for NC-JT measurement hypotheses, the WD can perform CSI measurements in an efficient way for FR2, as well.

According to one aspect, a method in a network node includes transmitting a first indication indicating to a WD a set of CMRs to use for determining CSI, the CSI including at least one of (i) a first CSI for multi-TRP PDSCH, transmission, and (ii) at least one second CSI for PDSCH transmission from one TRP. The process also includes transmitting a second indication indicating to the WD a first subset of CMRs from the set of CMRs to use for determining the first CSI. The process also includes configuring the WD to use a second subset of CMRs from the set of CMRs for determining the at least one second CSI. The process also includes receiving a CSI report comprising at least one of the first CSI and the at least one second CSI.

According to another aspect, a network node configured to communicate with a wireless device includes a radio interface configured to: transmit a first indication indicating to the WD a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP; and transmit a second indication indicating to the WD a first subset of CMRs from the set of CMRs to use for determining the first CSI. The network node also includes processing circuitry in communication with the radio interface and configured to configure the WD to use a second subset of CMRs from the set of CMRs for determining the at least one second CSI. The radio interface is further configured to receive a CSI report comprising at least one of the first CSI and the at least one second CSI.

According to another aspect, a method in a wireless device includes receiving a first indication of a set of CMRs, to use for determining CSI, the CSI including at least one of (i) a first CSI for multi-TRP, PDSCH, transmission, and (ii) at least one second CSI for PDSCH transmission from one TRP. The process also includes receiving a second indication of a first subset of CMRs from the set of CMRs to use for determining the first CSI. The process also includes determining the at least one second CSI using a second subset of CMRs from the set of CMRs. The process further includes transmitting a CSI report comprising at least one of the first CSI and the at least one second CSI.

According to yet another aspect, a WD configured to communicate with a network node, includes a radio interface configured to: receive a first indication of a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP; and receive a second indication of a first subset of CMRs from the set of CMRs to use for determining the first CSI. The WD also includes processing circuitry in communication with the radio interface and configured to determine the at least one second CSI using a second subset of CMRs from the set of CMRs. The radio interface is further configured to transmit a CSI report comprising at least one of the first CSI and the at least one second CSI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart of an example process in a network node in accordance with principles disclosed herein;

FIG. 13 is an example of implicit mapping;

DETAILED DESCRIPTION

Figure 1:
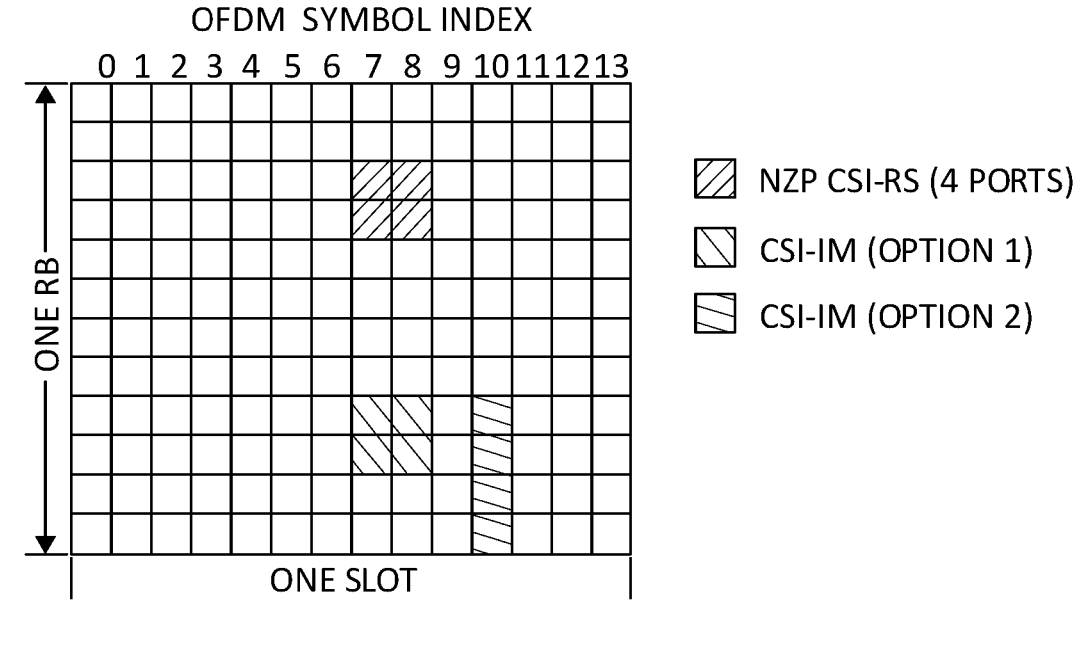
FIG. 1 is an example of a resource element allocation.
Figure 2:
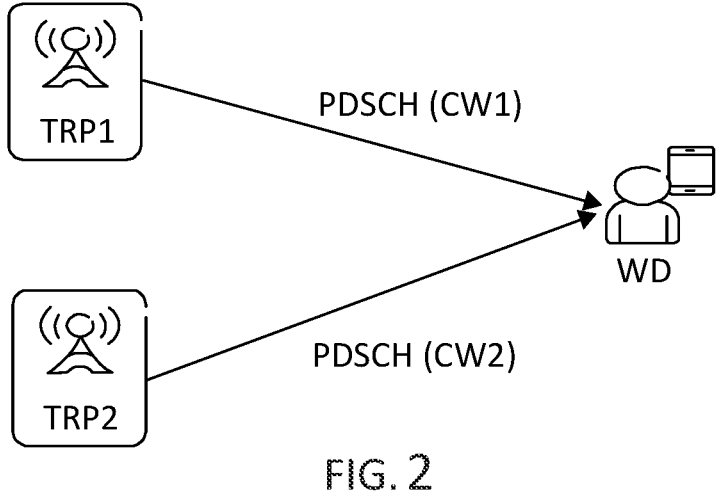
FIG. 2 is an example of NC-JT.
Figure 3:
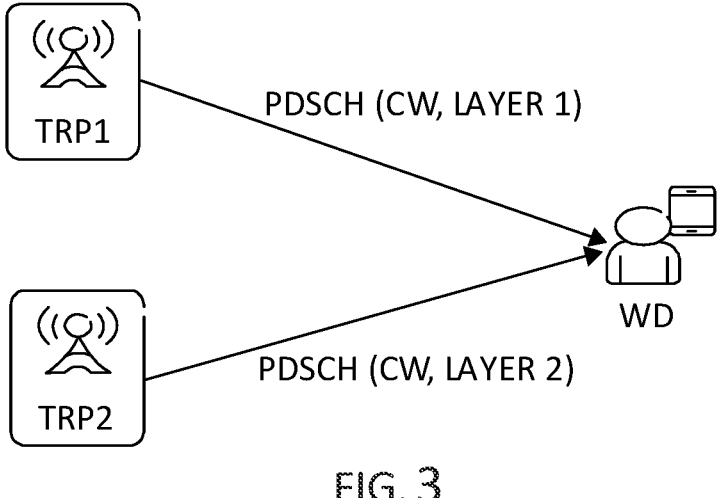
FIG. 3 is another example of NC-JT.
Figure 4:
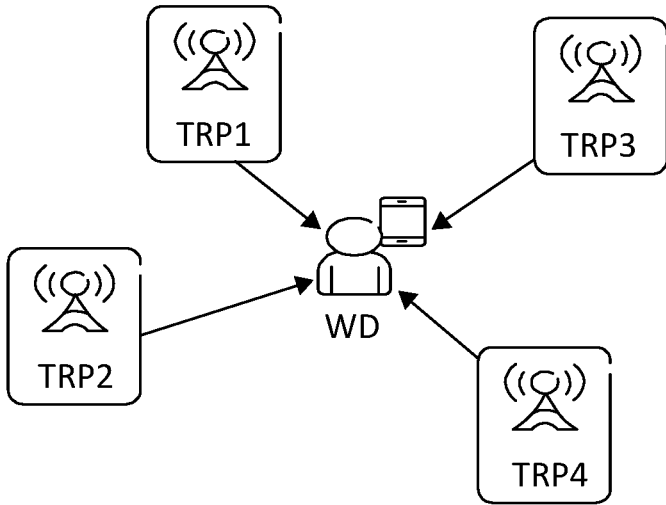
FIG. 4 is an example of a possible measurement hypothesis.

Before describing in detail example embodiments, it is noted that the embodiments reside primarily in combinations of apparatus components and processing steps related to framework and signaling for dynamic NC-JTCSI hypothesis indication. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled." "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

In some embodiments, the non-limiting terms WD or a user equipment (UE) are used interchangeably. The WD herein can be any type of wireless device capable of communicating with a network node or another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipment (LEE), laptop mounted equipment (LME), USB dongles, Customer Premises Equipment (CPE), an Internet of Things (IoT) device, or a Narrowband IoT (NB-IoT) device, etc.

Note that although terminology from one particular wireless system, such as, for example, 3GPP LTE and/or NR, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 5:
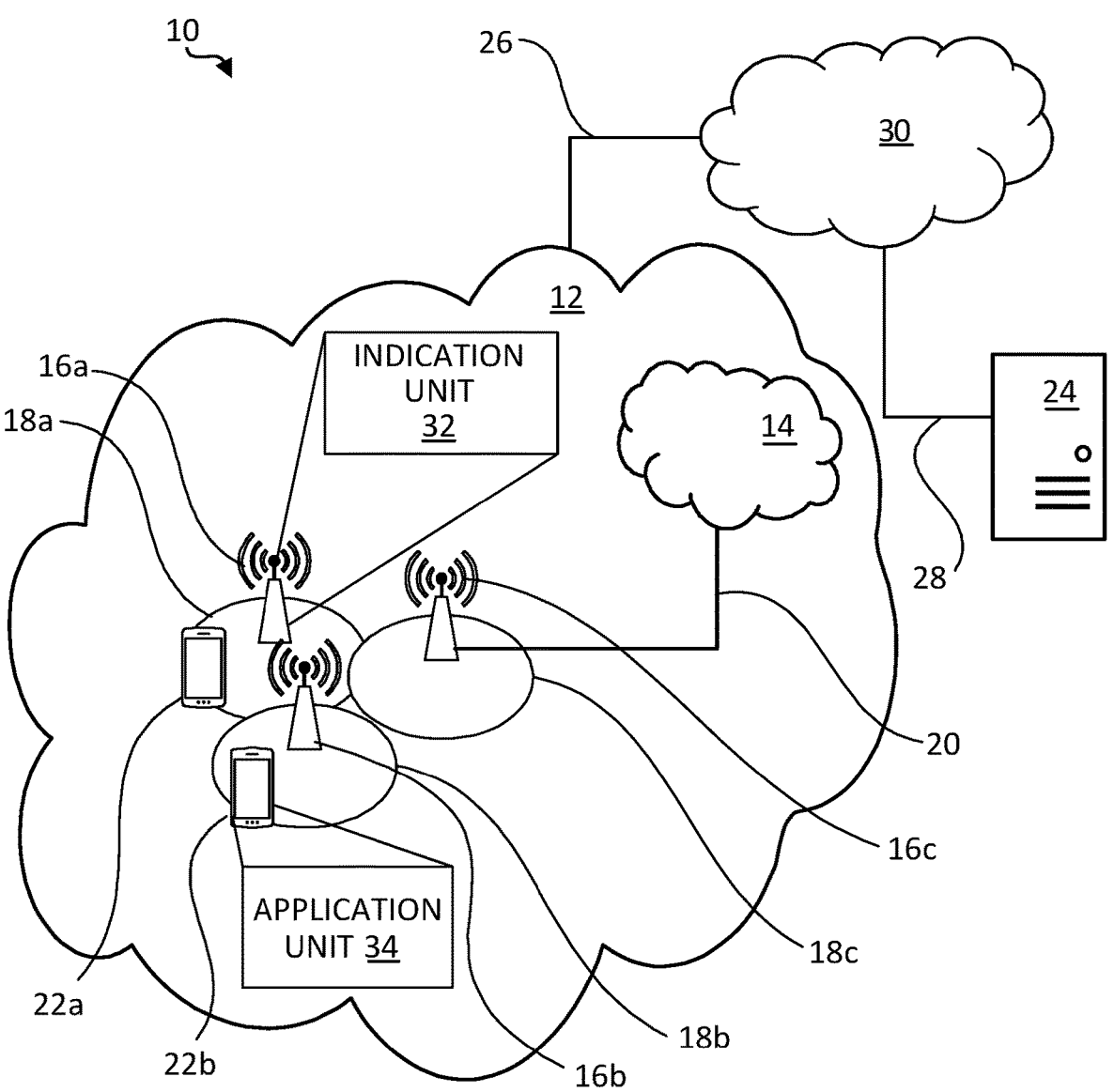
FIG. 5 is a schematic diagram of an example network architecture illustrating a communication system connected via an intermediate network to a host computer according to the principles in the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Returning now to the figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first WD 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to transmit an indication of at least one measurement hypothesis to be included by the WD in a CSI report, the indication indicating at least one set of CMR to be used by the WD to measure a channel between the network node and the WD according to the indicated at least one measurement hypothesis. A WD 22 is configured to include an application unit 34 which is configured to apply the at least one measurement hypothesis.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs and/or ASICs adapted to execute instructions. The processor 70 may be configured to access (e.g., write to and/or read from) the memory 72, which may comprise any kind of volatile and/or nonvolatile memory, e.g., cache and/or buffer memory and/or RAM and/or ROM and/or optical memory and/or EPROM.

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the indication unit 32 as described above.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. The processing circuitry 84 may be similar to the processing circuitry 68 of the network node 16, as described above.

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an application unit 34 which is configured to apply the at least one measurement hypothesis.

Figure 6:
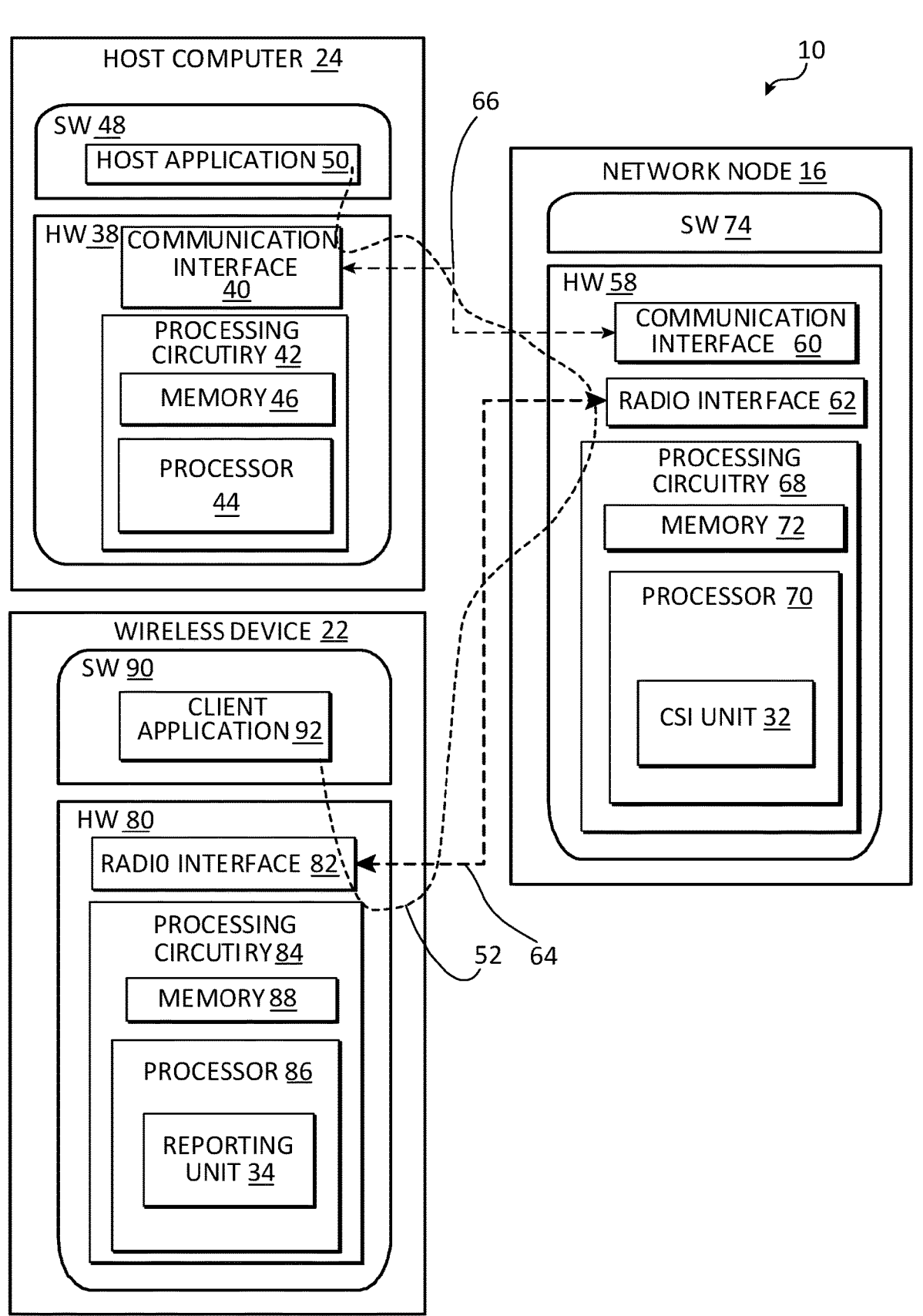
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the WD 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as indication unit 32, and application unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 7, 8:
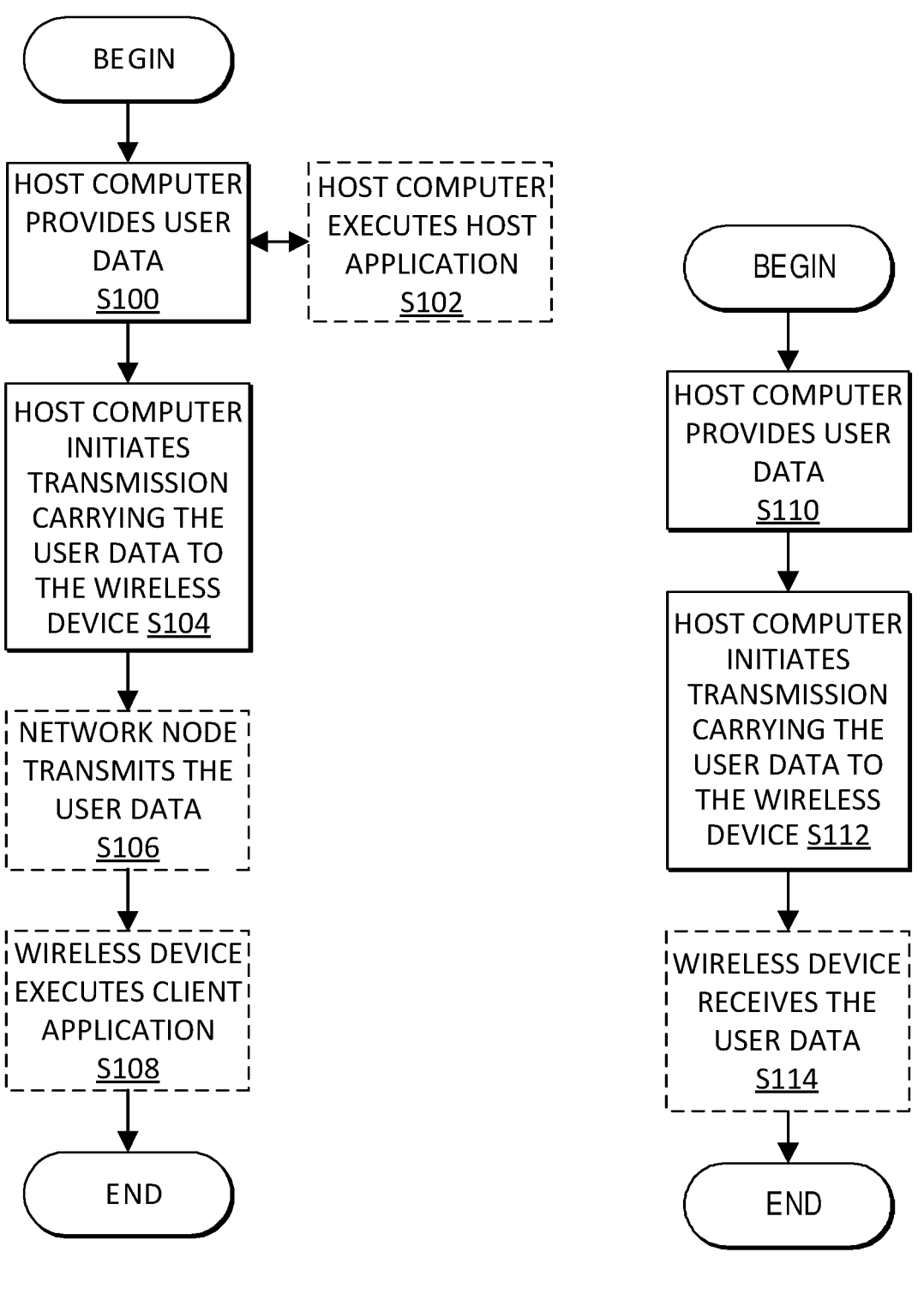
FIG. 7 is a flowchart illustrating example methods implemented in a communication system including a host computer, a network node and a wireless device for executing a client application at a wireless device according to some embodiments of the present disclosure.
FIG. 8 is a flowchart illustrating example methods implemented in a communication system including a host computer, a network node and a wireless device for receiving user data at a wireless device according to some embodiments of the present disclosure.

FIG. 7 is a flowchart illustrating an example method implemented in a communication system, such as, for example, the communication system of FIGS. 5 and 6, in accordance with one embodiment. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 8 is a flowchart illustrating an example method implemented in a communication system, such as, for example, the communication system of FIG. 5, comprising a host computer 24, a network node 16 and a WD 22 of FIG. 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments of this disclosure. In an optional third step, the WD 22 receives the user data carried in the transmission (Block S114).

Figures 9, 10:
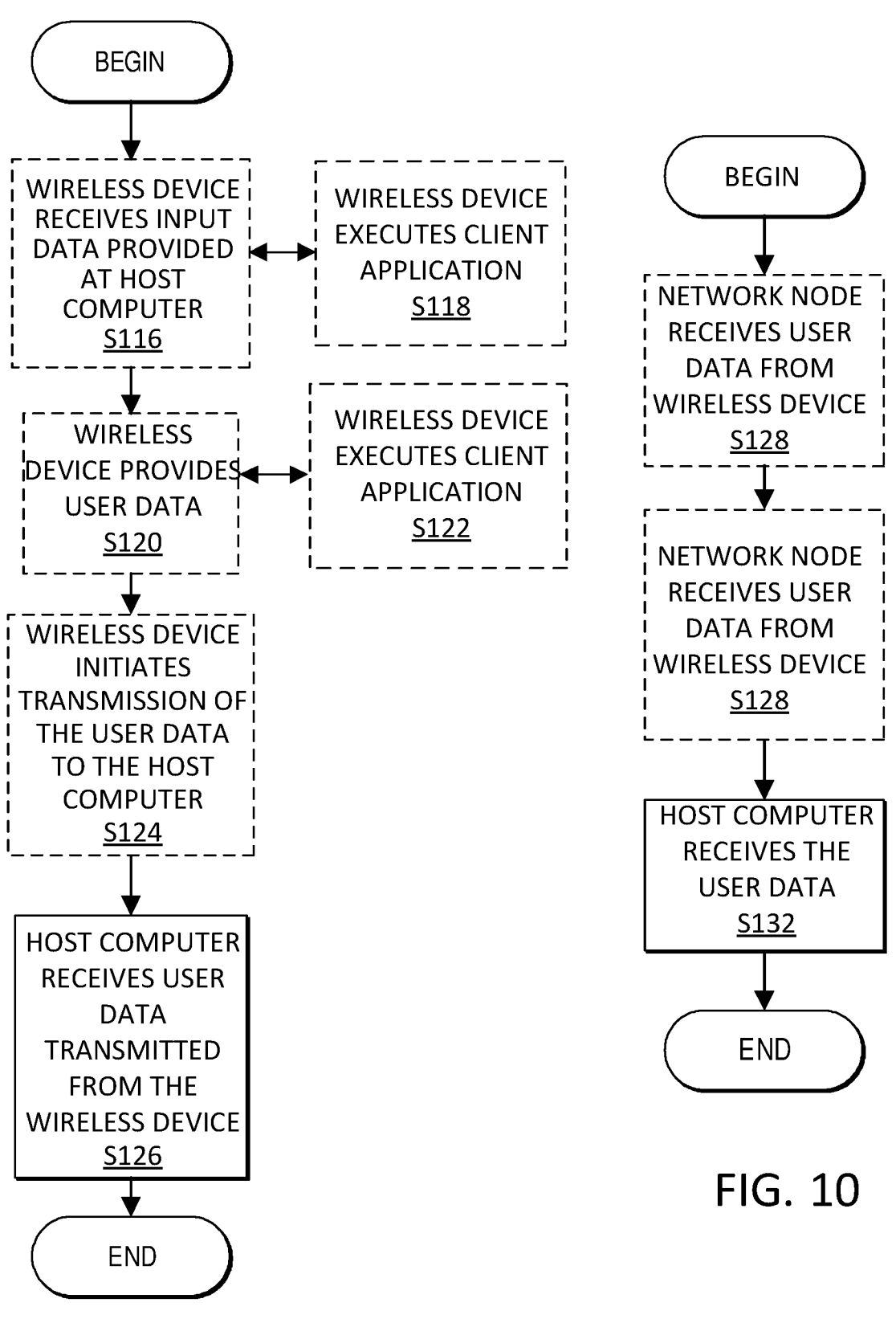
FIG. 9 is a flowchart illustrating example methods implemented in a communication system including a host computer, a network node and a wireless device for receiving user data from the wireless device at a host computer according to some embodiments of the present disclosure.
FIG. 10 is a flowchart illustrating example methods implemented in a communication system including a host computer, a network node and a wireless device for receiving user data at a host computer according to some embodiments of the present disclosure.

FIG. 9 is a flowchart illustrating an example method implemented in a communication system, such as, for example, the communication system of FIG. 5, with a host computer 24, a network node 16 and a WD 22 of FIG. 6. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126). FIG. 10 is a flowchart illustrating an example method implemented in a communication system, such as, for example, the communication system of FIG. 5, including a host computer 24, a network node 16 and a WD 22 of FIG. 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 11 is a flowchart of an example process in a network node 16 according to principles set forth herein. One or more blocks described herein may be performed by one or more elements of network node 16 such as by one or more of processing circuitry 68 (including the indication unit 32), processor 70, radio interface 62 and/or communication interface 60. Network node 16 is configured to transmit a first indication indicating to the WD a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP (Block S134). The process also includes transmitting a second indication indicating to the WD a first subset of CMRs from the set of CMRs to use for determining the first CSI (Block S136). The process also includes configuring the WD to use a second subset of CMRs from the set of CMRs for determining the at least one second CSI (Block S138). The process also includes receiving a CSI report comprising at least one of the first CSI and the at least one second CSI (Block S140).

In some embodiments, configuring the WD includes transmitting a radio resource control, RRC, parameter. In some embodiments, the RRC parameter is included in a CSI-ReportConfig information element, IE. In some embodiments, configuring the WD includes indicating that CMR resources in the second subset of CMRs do not include the CMR resources in the first subset of CMRs. In some embodiments, configuring the WD includes indicating that at least one CMR of the first subset of CMRs is to be reused in the second subset of CMRs. In some embodiments, the second subset of CMRs partially overlaps with the first subset of CMRs. In some embodiments, configuring the WD includes indicating that only CMRs from the first subset of CMRs are to be used in the second subset of CMRs. In some embodiments, the second indication explicitly indicates the first subset of CMRs, the explicit indication including indication of pairs of non-zero power (NZP) CSI reference signal resource IDs. In some embodiments, the second indication indicates the first subset of CMRs via a downlink control information, DCI, message.

In some embodiments, the first subset of CMRs is indicated in a CSI-AssociatedReportConfigInfo information element triggered by a CSI Request field in the DCI message. In some embodiments, the second indication includes indicating the first subset of CMRs via a medium access control control element, MAC CE, message.

Figure 12:
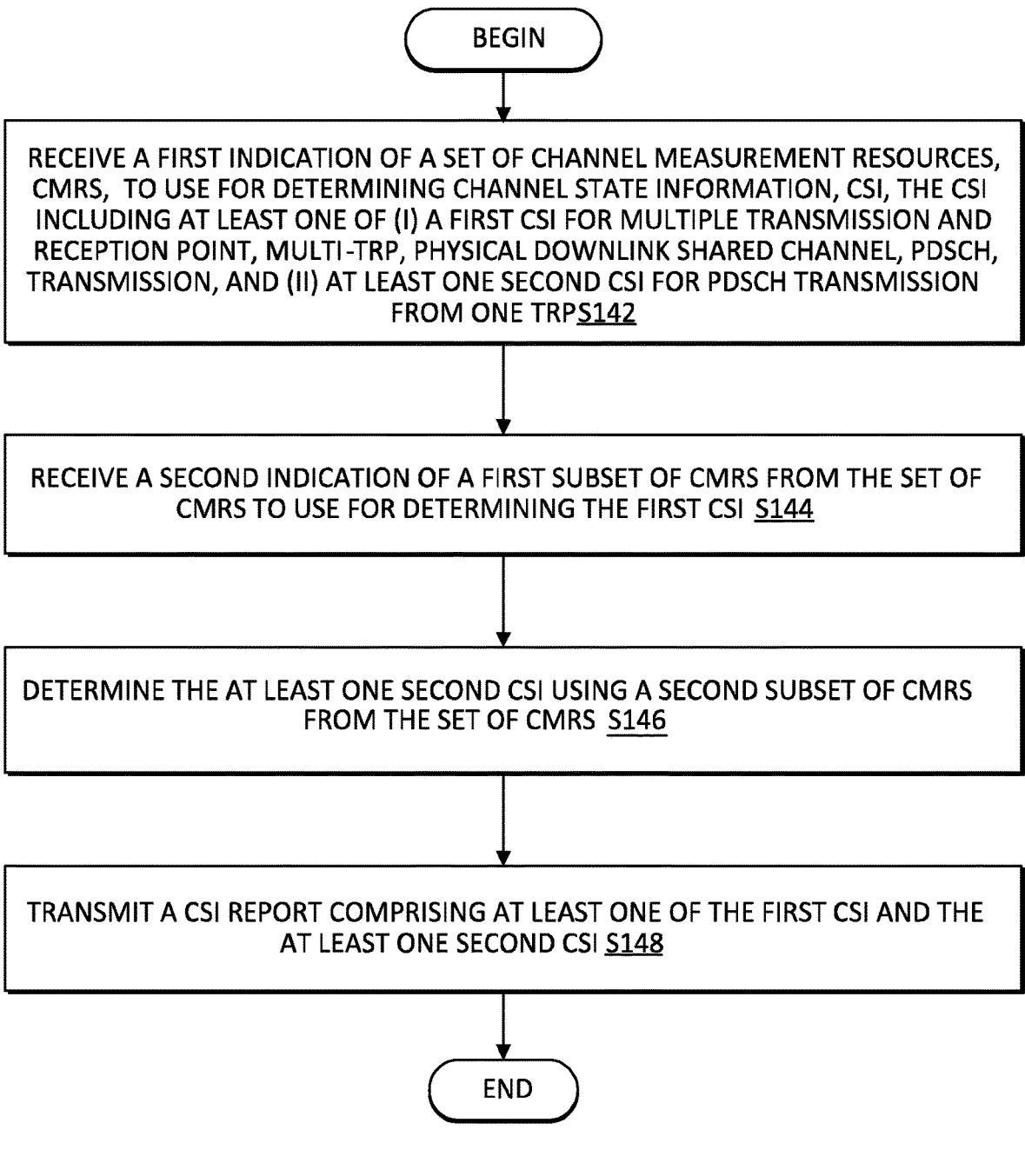
FIG. 12 is a flowchart of an example process in a wireless device according to principles set forth herein.

FIG. 12 is a flowchart of an example process in a wireless device 22 according to some embodiments of the present disclosure. One or more blocks described herein may be performed by one or more elements of wireless device 22 such as by one or more of processing circuitry 84 (including the application unit 34), processor 86, radio interface 82 and/or communication interface 60. Wireless device 22 is configured to receive a first indication of a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP (Block S142). The process also includes receiving a second indication of a first subset of CMRs from the set of CMRs to use for determining the first CSI (Block S144). The process also includes determining the at least one second CSI using a second subset of CMRs from the set of CMRs (Block S146). The process further includes transmitting a CSI report comprising at least one of the first CSI and the at least one second CSI (Block S148).

In some embodiments, the indication is a radio resource control, RRC, parameter. In some embodiments, the RRC parameter is included in a CSI-ReportConfig information element, IE. In some embodiments, CMR resources in the second subset of CMRs do not include CMR resources in the first subset of CMRs. In some embodiments, at least one CMR of the first subset of CMRs is to be reused in the second subset of CMRs. In some embodiments, the second subset of CMRs partially overlaps with the first subset of CMRs. In some embodiments, only CMRs from the first subset of CMRs are used in the second subset of CMRs.

Having described the general process flow of arrangements of the disclosure and having provided examples of hardware and software arrangements for implementing the processes and functions of the disclosure, the sections below provide details and examples of arrangements for framework and signaling for dynamic NC-JT CSI hypothesis indication.

In 3GPP NR Rel-17, there is a need for the network node 16 to dynamically indicate which of the CMRs, which are typically NZP CSI-RSs, in a CSI-RS resource set the WD 22 should use for NC-JT CSI calculations. This is because the 2 CMRs (corresponding to two TRPs) that are best suited for NC-JT may vary with time. For example, at time t1, TRP1 and TRP2 may be the most suitable for NC-JT reception by the WD 22. However, if the WD 22 moves to a different location, at time t2, the WD 22 may see TRP2 and TRP3 as the most suitable for NC-JT reception. If the CMR pairs to be used for NC-JT CSI are semi-statically configured via RRC, then any changes in the suitable CMR pairs may require RRC reconfiguration which is slow and inefficient. A more suitable approach would be for the network node 16 to dynamically indicate which CMR(s) the WD 22 should use for NC-JT CSI calculations. In the detailed embodiments below, different signaling mechanisms for indicating CMR pairs to be used for NC-JT CSI are disclosed. In addition, signaling mechanisms are included for indicating which CMRs to be used for single-TRP CSI.

Also, a CMR used for NC-JT CSI measurement hypothesis can be re-used for single TRP measurement hypothesis. Note that CMRs in each CMR group can be used for both NC-JT and Single-TRP measurement hypotheses.

However, for NR frequency range 2 (FR2, see 3GPP TS 38.101-2 v17.0.0), where the WD 22 might use different WD 22 panels/UE beams for different TRPs, reusing the same CMR for a single-TRP measurement hypothesis and a NC-JT CSI measurement hypothesis might not work in a suitable way. For example, assume a coordination cluster with two TRPs (TRP1 and TRP2) and a WD 22 with 4 WD 22 panels, where two WD 22 panels can be active and used to receive from a single TRP to improve receive diversity. In this case, the WD 22 might use, for example:

WD 22 panel 1 and WD 22 panel 2 for single-TRP CSI measurement hypothesis for TRP1;

WD 22 panel 3 and WD 22 panel 4 for single-TRP CSI measurement hypothesis for TRP2; and WD 22 panel 1 and WD 22 panel 3 for NC-JT CSI measurement hypothesis (for TRP1 and TRP2).

Because the WD 22 in this example uses different panels for the two single TRP CSI measurement hypothesis, the WD 22 will not be able to determine the inter-layer interference between the two TRPs from these single-TRP measurements. For instance, it will not be possible for the WD 22 to determine the interference generated from TRP2 to WD 22 panel 1 which is used for NC-JT CSI measurement hypothesis, since the WD 22 only uses WD 22 panel 1 to receive CMRs from TRP1. Therefore, separate CMRs are needed for respective CSI measurement hypothesis for FR2. In this disclosure, detailed signaling embodiments on how to indicate to the WD 22 which CMRs are to be used for NC-JT CSI measurement hypothesis and single-TRP CSI measurement hypothesis are provided.

It should be noted, however, that the reuse of CMRs for NC-JT CSI measurement hypothesis and single-TRP CSI measurement hypothesis is still possible in NR frequency range 1 (FR1, see 3GPP TS 38.101-1 v17.0.0). This is because in FR1, the WDs are typically not equipped with multiple panels, and hence a channel measurement on a CMR corresponding to a given TRP can be used for both single-TRP CSI measurement hypothesis and a NC-JT CSI measurement hypothesis involving that TRP. In this disclosure, detailed signaling embodiments on indicating the use of the same CMR(s) for NC-JT CSI measurement hypothesis and single-TRP CSI measurement hypothesis is also disclosed.

Note that the term TRP may not actually be used in 3GPP specifications. In some embodiments, a TRP may be either a network node 16, a radio head, a spatial relation, or a TCIstate. A TRP may be represented by a spatial relation or a TCI state in some embodiments. In some embodiments, a TRP may be using multiple TCI states. In some embodiments, a TRP may be a part of the network node 16 transmitting and receiving radio signals to/from WD 22 according to physical layer properties and parameters inherent to that element. In some embodiments, a TRP may be a part of the network node 16 transmitting and receiving radio signals to/from WD 22 according to physical layer properties and parameters inherent to that element. In some embodiments, in Multiple multi-TRP operation, a serving cell can schedule WD 22 from two TRPs, providing better PDSCH coverage, reliability and/or data rates. There are two different operation modes for multi-TRP: single-DCI and multi-DCI. For both modes, control of uplink and downlink operation is done by both physical layer and MAC. In single-DCI mode, WD 22 is scheduled by the same DCI for both TRPs and in multi-DCI mode, WD 22 is scheduled by independent DCIs from each TRP. In some embodiments, the TRP may be represented by a CMR group as described in detailed embodiments below. In some other embodiments, a TRP may be represented by a CMR, NZP CSI-RS resource, or a CRI.

The term NC-JT may not be captured in 3GPP specifications. Instead, NC-JT may be described as receiving multiple PDSCH layers with PDSCH being scheduled by DCI that indicates 2 TCI states wherein the PDSCH DM-RS ports belong to two different code division multiplexing (CDM) groups as specified in 3GPP TS 38.214. In the embodiments below, even though the configuration of CMR pairs is described in terms of bitfields, such configurations may also be done via other types of indicators such as integers, sequence of integers, etc. Furthermore, the terms CSI report setting and CSIReportConfig are used interchangeably.

In one embodiment, a single bitfield is configured in, e.g., a CSI Report setting, indicating which of the single-TRP/NC-JT CSI measurement hypothesis the WD 22 should include in the CSI calculation/reporting. In some embodiments, each bit in the bitfield corresponds to a NC-JT CSI measurement hypothesis which consists of a pair of CMRs that are configured to the WD 22. In some embodiments, the bits in the bitfield may correspond to either a NC-JT CSI measurement hypothesis or a single-TRP CSI measurement hypothesis. In case of a NC-JT CSI measurement hypothesis, there is a pair of CMRs that are configured to the WD 22. In the case of a single-TRP CSI measurement hypothesis, there is only a single CMR that is configured to the WD 22. In some embodiments, each bit in the bitfield corresponds to both a NC-JT CSI measurement hypothesis and two single-TRP CSI measurement hypotheses. That is, a pair of CMRs are configured for a NC-JT CSI measurement hypothesis where each of the two CMRs can be used for two single-TRP CSI measurement hypothesis.

Note that in the above embodiments, the pair of CMRs may be two CMRs from the channel measurement resource set configured in 'resourcesForChannelMeasurement' of CSI-ReportConfig. Similarly, a single CMR to be used for single-TRP CSI measurement hypothesis is from the channel measurement resource set configured in 'resourcesForChannelMeasurement' of CSI-ReportConfig.

In one alternate of this embodiment, the single bitfield is a string of Boolean operators, and where each Boolean operator indicates if a NC-JT CSI measurement hypothesis should be applied or not.

```
BIT STRING                    (SIZE (xxxx)),
   Alternatively, the pairing bit field may be configured as follows:
pairingBitfield               SEQUENCE (size(xx)) of Hypothesis
Hypothesis ::=                 SEQUENCE {
   hypothesis                  BOOLEAN        OPTIONAL
}
```

In one alternate of this embodiment, there is an implicit mapping between the bits in the bitfield and the different CMR pairs used for NC-JT measurement hypotheses. One example of how this implicit mapping might be implemented will be described with reference to FIG. 13, where a CSI Report setting for NC-JT CSI is configured with a NZP CSI-RS resource set with 5 NZP CSI-RS resources (CMRs). The CMRs are divided in to two CMR groups, where there are three CMRs in CMR group 0 and 2 CMRs in CMR group 1. Since each NC-JT CSI measurement hypothesis should consist of one CMR from each CMR group, there are 6 possible NC-JT measurement hypotheses for this CSI-RS resource set (CMR1-CMR4, CMR1-CMR5, CMR2-CMR4, CMR2-CMR5, CMR3-CMR4, CMR3-CMR5). Hence, 6 bits of the bitfield should be implicitly associated to these 6 candidate NC-JT measurement hypotheses, where each of these 6 bits indicates if the WD 22 should measure the CMR pairs, compute CSI and report the CSI corresponding NC-JT CSI measurement hypothesis associated with that bit.

```
-- ASN1START
-- TAG-CSI-REPORTCONFIG-START
   CSI-ReportConfig ::=              SEQUENCE {
      reportConfigId                 CSI-ReportConfigId,
      carrier                        ServCellIndex     OPTIONAL,   -- Need
S
      resourcesForChannelMeasurement              CSI-ResourceConfigId,
      csi-IM-ResourcesForInterference             CSI-ResourceConfigId
OPTIONAL,   -- Need R
      nzp-CSI-RS-ResourcesForInterference         CSI-ResourceConfigId
OPTIONAL,   [...]
      },
         ncjt-CMR-pairing              -bitfield-r17
         SEQUENCE (SIZE (1..maxNumberOfCandidateNCJT-
Hypotheses)) OF BOOLEAN
      },
```

In one alternate of this embodiment, the length of the bitfield equals the maximum number of candidate NC-JT CSI measurement hypotheses that a WD 22 can be configured with (either according to specification or according to WD 22 capability). For example, assuming that the maximum number of NZP CSI-RS resources in a CSI-RS resource set used for channel measurement for NC-JT CSI is equal to 8, then the maximum number of candidate NC-JT hypotheses would be $k1*k2=4*4=16$, where k1 is the number of NZP CSI-RS resources in CMR group 0 and k2 is the number of NZP CSI-RS resources in CMR group 1. This means that the bitfield of Boolean operators would be 16 bits long. Note that in this example, the NZP CSI-RS resources for channel measurement are split into two groups (i.e., CMR group 0 and CMR group 1). The CMR group may be configured to the WD 22 via a CMR group index that is included per each CMR (i.e., the NZP CSI-RS resource configuration includes a CMR group index). Alternatively, the WD 22 can be configured with two lists of NZP CSI-RS indices where each list corresponds to one of the CMR groups.

Note that other RRC configurations are also possible, for example a bit string can be used as shown below.

In this example, the left most bit (X1) in the bitfield is associated with a first NC-JT CSI measurement hypothesis, the second bit from the left is associated with a second NC-JT CSI measurement hypothesis and so on. The NC-JT CSI measurement hypothesis could be ordered according to:
   the first NC-JT hypothesis corresponds to the CMR with lowest CSI-RS resource ID in the first CMR group (CMR group 0) and the CMR with lowest CSI-RS resource ID in the second CMR group (CMR group 1);
   the second NC-JT hypothesis corresponds to the CMR with lowest CSI-RS resource ID in the first CMR group and the CMR with second lowest CSI-RS resource ID in the second CMR group;
   the third NC-JT hypothesis corresponds to the CMR with second lowest CSI-RS resource ID in the first CMR group and the CMR with second lowest CSI-RS resource ID in the second CMR group;
   and so on.
   The NC-JT hypothesis order in this example is based on: first taking the CMR with lowest CSI-RS resource ID in the first CMR group and then pair that CMR with all CMRs in the second CMR group, where the CMR order in the second CMR group also is based on lowest CSI-RS resource ID for these CMRs. Then the same can be done for the CMR with second lowest CSI-RS resource ID in the first CMR group, and so on until all the CMRs in the first CMR group has been paired with one CMR in the second CMR group.

Note that this is just one example of an implicit mapping between the bits in the bitfield and the candidate NC-JT measurement hypotheses, and other implicit mappings are also possible. For example, the order of the bits in the bitfield might start from the right instead of starting from the left.

FIG. 13 is an example of one embodiment, where a bitfield is used to indicate which NC-JT measurement hypotheses the WD 22 should include for NC-JT CSI reporting, and the implicit mapping between the bits in the bitfields and the candidate NC-JT measurement hypotheses. In cases where the maximum number of NC-JT CSI measurement hypothesis the WD 22 can measure and calculate CSI for (due to, e.g., limited CPU capability at the WD 22) is smaller than the total number of candidate NC-JT CSI measurement hypothesis for the corresponding CSI-RS resource set, it may be possible to reduce the number of bits used to indicate the NC-JT CSI measurement hypothesis. Here, each hypothesis is given by a bit that indicates which CMR pair the WD 22 should measure the channel(s) on and report CSI for. For example, assume that the WD 22 is only capable of calculating one NC-JT CSI measurement hypothesis for an NC-JT CSI report and that the maximum number of candidate NC-JT hypothesis still is equal to 16, then only 4 bits are needed in a bitfield to select the NC-JT CSI measurement hypothesis. One example of such a bitfield is illustrated in FIG. 13, where each codepoint in the bitfield is associated to one of the candidate NC-JT CSI measurement hypotheses.

With the above embodiment, the NC-JT CMR pairing can also be configured in a CSI-ReportConfig as an integer. In this embodiment, a single NC-JT CSI hypothesis is configured to the WD 22 which the WD 22 will use to measure the channel, compute CSI, and report CSI. Assume that the NC-JT CSI measurement hypotheses are ordered from 1 to 6 according to the example in FIG. 13. Then, the WD 22 could be configured with the NC-JT CSI CMR pair to use by the integer ncjt-CMR-pairing-r17 in CSI-ReportConfig.

The following is an example of an RRC configuration of a bitfield used to indicate one NC-JT CSI measurement hypothesis used for NC-JT CSI computation and reporting.

```
-- ASN1START
-- TAG-CSI-REPORTCONFIG-START
CSI-ReportConfig ::=        SEQUENCE {
   reportConfigId          CSI-ReportConfigId,
   carrier              ServCellIndex      OPTIONAL,  -- Need
S
   resourcesForChannelMeasurement      CSI-ResourceConfigId,
   csi-IM-ResourcesForInterference      CSI-ResourceConfigId
OPTIONAL,  -- Need R
   nzp-CSI-RS-ResourcesForInterference      CSI-ResourceConfigId
OPTIONAL,  [...]
      ncjt-CMR-pairing      -r17            INTEGER (1..
maxNumberOfCandidateNCJT-Hypotheses)
   },
```

Figure 14:
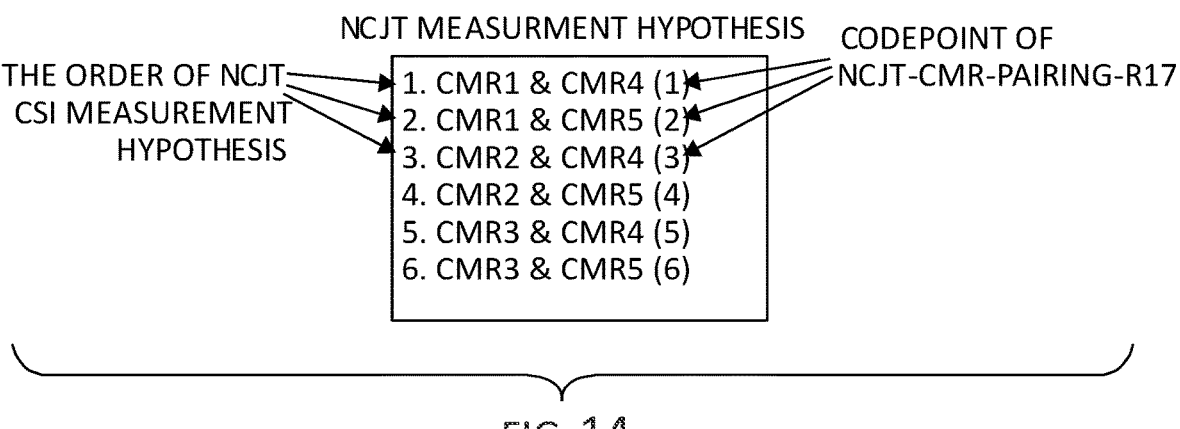
FIG. 14 is an example of bitfield and codepoints.

In one alternate of this embodiment, there is an implicit mapping between the different codepoints of the bitfield and the different CMR pairs used for NC-JT measurement hypotheses. FIG. 14 is an example of a bitfield and the codepoints association to NC-JT measurement hypotheses used to indicate a single NC-JT hypothesis. One example of this will be described with reference to FIG. 14 where a Report setting for NC-JT CSI is pointing to a NZP CSI-RS resource set with 5 NZP CSI-RS resources (CMRs), and where the CMRs are divided in to two CMR groups, with three CMR in CMR group 0 and 2 CMRs in CMR group 1. Since each NC-JT CSI measurement hypothesis should consist of one CMR from each CMR group, there are 6 possible NC-JT measurement hypotheses for this CSI-RS resource set (CMR1-CMR4, CMR1-CMR5, CMR2-CMR4, CMR2-CMR5, CMR3-CMR4, CMR3-CMR5). Hence, 6 codepoints of the bitfield should be implicitly associated to these 6 candidate NC-JT CSI measurement hypotheses. Here, the same order as was described in the previous embodiment of NC-JT CSI measurement hypothesis could be used, and the first NC-JT CSI measurement hypothesis, could then be associated to codepoint "1", the second NC-JT CSI measurement hypothesis could be associated with codepoint "2" and so on.

This embodiment could easily be extended to using multiple bitfields, where each bitfield indicates one NC-JT CSI measurement hypothesis in case the WD 22 could calculate more than one NC-JT CSI measurement hypothesis during a NC-JT CSI report. One example of this is given in the pseudocode below. where M (=max number of NC-JT CSI measurement hypothesis given by 'maxNrofNCJT-Hypothesis' that the WD 22 can measure and calculate during one NC-JT CSI report) bitfields are configured, and where each bitfield is used to point to one of the N (=max number of candidate NC-JT CSI measurement hypotheses given by 'maxNumberOfCandidateNCJT-Hypotheses') NC-JT CSI measurement hypotheses. Note that when the WD 22 is configured with M different NC-JT CSI hypotheses, the WD 22 would measure the M CMR pairs corresponding to the M different NC-JT CSI hypotheses. However, the WD 22 would only report one of the M NC-JT CSI which would yield the best performance, in some embodiments.

The following is an example of RRC configuration of a list of bitfields used to indicate one or several NC-JT measurement hypotheses used for NC-JT CSI reporting.

```
-- ASN1START
-- TAG-CSI-REPORTCONFIG-START
CSI-ReportConfig ::=        SEQUENCE {
   reportConfigId          CSI-ReportConfigId,
   carrier              ServCellIndex      OPTIONAL,  -- Need
S
   resourcesForChannelMeasurement      CSI-ResourceConfigId,
   csi-IM-ResourcesForInterference      CSI-ResourceConfigId
OPTIONAL,  -- [...]
      ncjt-CMR-pairing      -list-r17
      SEQUENCE( SIZE(1..maxNrofNCJT-Hypothesis)) of INTEGER
(1.. maxNumberOfCandidateNCJT-Hypotheses)
   },
```

Figure 15:
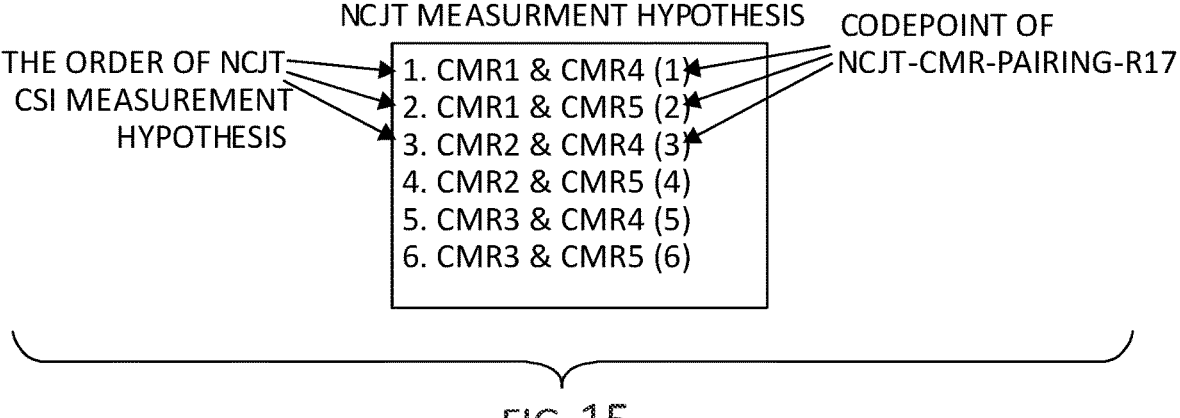
FIG. 15 is an example of a list of bit fields.

FIG. 15 is an example of a list of bitfields and their codepoints association to NC-JT measurement hypotheses used to indicate one or several NC-JT hypothesis.

The mapping between a codepoint of each bitfield in the list of bitfields can be the same, as schematically illustrated in FIG. 15. So, for example, if the codepoint of the first bitfield in the list of bitfields is equal to "2" and the codepoint of the second bitfield in the list of bitfields is equal to "4", then the WD 22 should measure NC-JT CSI measurement hypotheses 2 and 4, i.e.: "CMR1&CMR5" and "CMR2&CMR5".

In one alternate of this embodiment, one codepoint of each bitfield is associated with "no NC-JT CSI measurement hypothesis" for that bitfield. For example, assuming that codepoint "0" is reserved for that purpose and if the network node 16 indicates codepoint 0 of Bitfield2, the WD 22 should omit the second NC-JT CSI measurement hypothesis.

In one embodiment, the two CMR groups in a NZP CSI-RS resource set may be indicated with a bitmap, with each bit associated with a NZP CSI-RS resource in the resource set. If a bit is set to 0, the associated NZP CSI-RS resource belongs to a first CMR group and if a bit is set to 1, the associated NZP CSI-RS resource belongs to a second CMR group. Alternatively, a first Ks1 NZP CSI-RS resource in the resource set belong to a first CMR group and the remaining NZP CSI-RS resources belong to a second CMR group. Ks1 is signaled to a WD 22 either in a CSI-ReportConfig CSI-AperiodicTriggerState, or as part of CSI-ReportConfig.

In one alternate of this embodiment, the single-TRP CSI measurement hypothesis associated to the NC-JT Report setting is implicitly determined by the CMRs corresponding to the indicated NC-JT measurement hypotheses. For example, assume that the network node 16 indicates that the WD 22 is to calculate NC-JT CSI measurement hypotheses on CMR1 and CMR4, then the WD 22 should also calculate single-TRP CSI measurement hypotheses for CMR1 and CMR4. Note that although this may work for FR1, it may not work in FR2. This is because, in FR2, the WD 22 may be equipped with multiple antenna panels. For single TRP CSI measurement hypothesis, the WD 22 may use multiple antenna panels to receive from a single TRP (to improve reception diversity). For NC-JT CSI hypothesis, the WD 22 may use a single antenna panel to receive from each of the WD 22 as a NC-JT CSI measurement hypothesis, the WD 22 may choose the CMRs for single-TRP CSI using one of the following examples:

Choose one CMR from CMR group 0 which may be one of CMR1, CMR2, or CMR3 for a first single TRP CSI measurement, and choose another CMR from CMR group 1 which may be one of CMR4 or CMR5 for a second single TRP CSI measurement hypothesis; or Choose only one CMR from either CMR group 0 or CMR group 1 for one single TRP CSI measurement. If a CMR from CMR group 0 is chosen, it can be any one of CMR1, CMR2, or CMR3. If a CMR from CMR group 1 is chosen, it can be any one of CMR4 or CMR5.

In one alternate of this embodiment, the bitfield(s) are configured in an aperiodic trigger state instead of in the CSI Report setting or CSI-ReportConfig (as used in the previous examples) and is shown below. If so, whenever the aperiodic trigger state is triggered, the WD 22 should apply the information in that bitfield indicating the NC-JT measurement hypotheses for the triggered NC-JT CSI report. In some embodiments, if another bitfield is already configured in the associated Report setting the WD 22 should override the bitfield in the Report setting in favor of the bitfield in the aperiodic trigger state.

The following is an example of RRC configuration of a bitfield in an aperiodic trigger state used to indicate one or several NC-JT measurement hypotheses used for NC-JT CSI reporting:

```
-- ASN1START
-- TAG-CSI-APERIODICTRIGGERSTATELIST-START
CSI-AperiodicTriggerStateList ::=            SEQUENCE (SIZE (1..maxNrOfCSI-
AperiodicTriggers)) OF CSI-AperiodicTriggerState
CSI-AperiodicTriggerState ::=            SEQUENCE {
    associatedReportConfigInfoList            SEQUENCE
(SIZE(1..maxNrofReportConfigPerAperiodicTrigger)) OF CSI-
AssociatedReportConfigInfo,
    ...
CSI-AssociatedReportConfigInfo ::=            SEQUENCE {
    reportConfigId            CSI-ReportConfigId,
    ncjt-CMR-pairing -list-r17            SEQUENCE(
SIZE(1..maxNrofNCJT-Hypothesis)) of INTEGER (1..
maxNumberOfCandidateNCJT-Hypotheses)
        resourcesForChannel            CHOICE {
        nzp-CSI-RS            SEQUENCE {
        resourceSet            INTEGER (1..maxNrofNZP-CSI-RS-
ResourceSetsPerConfig),
        qcl-info            SEQUENCE (SIZE(1..maxNrofAP-CSI-RS-
ResourcesPerSet)) OF TCI-StateId
    [...]
}-- TAG-CSI-APERIODICTRIGGERSTATELIST-STOP
-- ASN1STOP
```

TRPs. Since measurements are done using different numbers of panels, it may not be possible to use the same CMR pairs for both single-TRP CSI measurement hypothesis and NC-JT CSI measurement hypothesis.

In one alternate of this embodiment, each CMR in the CSI-RS resource set should be considered as a single-TRP CSI measurement hypothesis, regardless of which CMRs that are indicated for NC-JT CSI measurement hypotheses. In this embodiment, the CMRs used for single-TRP CSI are selected from the CSI-RS resource set and are chosen independently from the CMR pairs indicated for NC-JT CSI measurement hypotheses. Referring to the example in FIG. 16, when CMR pair CMR1 & CMR4 are indicated to the In another embodiment, a first CMR pair representing a first NC-JT CSI measurement hypothesis may be configured in a first CSI-AssociatedReportConfig. A second CMR pair representing a second NC-JT CSI measurement hypothesis may be configured in a second CSI-AssociatedReportConfig. The network node 16 can then trigger one of the CSI-AssociatedReportConfig's via the CSI Request field in DCI which contains one of the NC-JT CSI measurement hypothesis. After receiving the DCI, the WD 22 performs measurement on the corresponding CMR pair, computes CSI, and reports the corresponding NC-JT CSI to the network. A benefit of this embodiment is that the network can dynamically switch which NC-JT CSI measurement hypothesis the WD 22 should use for measurement, computing CSI and reporting.

In some FR2 scenarios, a WD 22 may not be able to reuse a CMR for multiple measurements. That is, the WD 22 may not be able to use a CMR for a NC-JT CSI measurement hypothesis and a single-TRP CSI measurement hypothesis as was assumed in the previous embodiments. This is because, in FR2, the WD 22 may be equipped with multiple antenna panels. For single TRP hypothesis, the WD 22 may use multiple antenna panels to receive from a single TRP to improve reception diversity. For NC-JT CSI hypothesis, however, the WD 22 may use a single antenna panel to receive from each of the TRPs. Since measurements are done using different number of panels, it may not be possible to use the same CMR pairs for both single-TRP CSI measurement hypothesis and NC-JT CSI measurement hypothesis.

In one embodiment, the bitfields and corresponding mappings to NC-JT CSI measurement hypotheses as described in previous embodiments related to FR1 are re-used for FR2. However, the 3GPP standards provide an additional rule that forbids use of a CMR for multiple measurement hypothesis. In one alternate of this embodiment, the CMRs in the NZP CSI-RS resource set associated to a report setting (i.e., a CSI-ReportConfig configured for NC-JT CSI reporting) that are not indicated for any NC-JT measurement hypotheses, are by default used for single-TRP measurement hypothesis, instead. One example of this is described with reference to FIG. 16. Here, assume that the WD 22 only can handle one NC-JT CSI measurement hypothesis and a single bitfield is used to indicate which of the 6 possible NC-JT measurement hypotheses the WD 22 should use. In this example, assume that the codepoint of the bitfield is equal to "1", which means that the WD 22 should use CMR1 & CMR 4 as NC-JT CSI measurement hypothesis. Since the remaining CMRs are not used for any NC-JT measurement hypotheses, they will by default be used for single-TRP measurement hypotheses instead, which means that the WD 22 should perform single-TRP measurement hypothesis on CMR2, CMR3 and CMR5.

Figure 16:
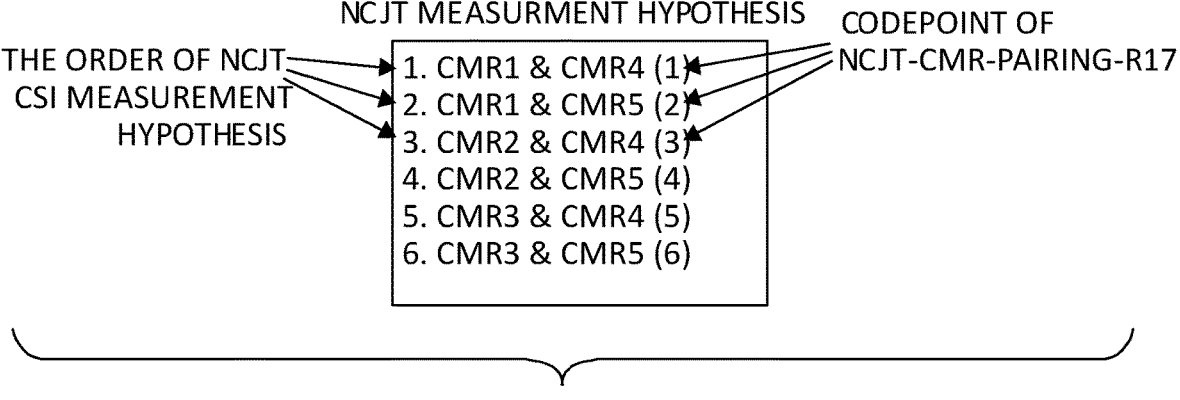
FIG. 16 is an example of using a bitfield to indicate a measurement hypothesis.

FIG. 16 is an example of embodiment related to FR2, where a bitfield is used to indicate a NC-JT measurement hypothesis. The remaining CMRs that are not used for any NC-JT measurement hypotheses are by default used for single-TRP measurement hypotheses.

In another example, more than one of the possible NC-JT measurement hypotheses are indicated to the WD 22. Consider another example with reference to FIG. 16 where the codepoints of the bitfield indicated are "1" and "2", which means that the WD 22 should use CMR pairs (CMR1, CMR 4) and (CMR1, CMR5) as NC-JT CSI measurement hypothesis. The remaining CMRs that are not used for any NC-JT measurement hypotheses are CMR2 and CMR3, and according to the above embodiment, these CMRs will be used for single-TRP measurement hypotheses.

In one alternate of this embodiment, one codepoint is reserved to indicate "no NC-JT CSI measurement hypothesis", which means that all the CMRs will instead be used for single-TRP measurement hypotheses.

In one embodiment, different bitfields are used for indicating single-TRP measurement hypotheses and NC-JT measurement hypotheses (instead of assuming that all CMRs not indicated for NC-JT CSI measurement hypothesis may be used for single-TRP measurement hypothesis). In this way, the network node 16 can indicate to the WD 22 which of the CMRs not included for NC-JT measurement hypotheses, that may be used for single-TRP CSI measurement hypotheses. This could be useful for example, if the network node 16 does not want to include certain CMRs/ TRP in the CSI calculations.

In another embodiment, the network node 16 may configure a higher layer parameter (e.g., RRC parameter) to control whether the CMRs used for NC-JT CSI measurement hypothesis can be reused or not for single-TRP measurement hypotheses. Consider the example in FIG. 16 and assume that CMR pair 1 (i.e., the pair that includes CMR1 & CMR4) is indicated to the WD 22 for NC-JT CSI measurement. Then, according to this embodiment, if the higher layer parameter is set to a first value, the WD 22 can reuse the indicated CMR pair 1 for single-TRP CSI measurement hypothesis. For instance, the WD 22 may use CMR1, CMR2, CMR3, CMR4 and CMR5 for performing measurements related to single TRP CSI hypothesis. If the higher layer parameter is set to a second value, the WD 22 may not reuse the indicated CMR pair 1 for single-TRP CSI measurement hypothesis. In this case, the WD 22 may use CMR2, CMR3 and CMR5 for performing measurements related to single TRP CSI hypothesis. In some embodiments, the higher layer parameter is configured either in CSI-ReportConfig, or in CSI-AssociatedReportConfigInfo configured per CSI-AperiodicTriggerState in the CSI-AperiodicTriggerStateList information element in 3GPP TS 38.331.

In an alternative embodiment, the network node 16 configures a higher layer parameter (e.g., RRC parameter) to control whether the CMRs used for NC-JT CSI measurement hypothesis can be reused or not for single-TRP measurement hypotheses. If the higher layer parameter is configured, then the NC-JT CSI measurement hypothesis can be reused for single-TRP measurement hypotheses by the WD 22. If the higher layer parameter is not configured, then the NC-JT CSI measurement hypothesis cannot be reused for single-TRP measurement hypotheses by the WD 22. Consider the example in FIG. 16 and assume that CMR pair 1 (i.e., the pair that includes CMR1 & CMR4) is indicated to the WD 22 for NC-JT CSI measurement. Then, according to this alternative embodiment, if the higher layer parameter is configured, the WD 22 can reuse the indicated CMR pair 1 also for single-TRP CSI measurement hypothesis. For instance, the WD 22 may use CMR1, CMR2, CMR3, CMR4 and CMR5 for performing measurements related to single TRP CSI hypothesis. If the higher layer parameter is not configured, the WD 22 may not reuse the indicated CMR pair 1 for single-TRP CSI measurement hypothesis. In this case, the WD 22 may use CMR2, CMR3 and CMR5 for performing measurements related to single TRP CSI hypothesis. In some embodiments, the higher layer parameter is configured either in CSI-ReportConfig, or in CSI-AssociatedReportConfigInfo configured per CSI-AperiodicTriggerState in the CSI-AperiodicTriggerStateList information element in 3GPP TS 38.331.

In another embodiment, a higher layer parameter is configured (e.g., RRC parameter) to indicate the WD 22 to only measure single-TRP CSI measurement hypotheses on the CMR pair(s) indicated for NC-JT CSI measurement hypothesis. Consider the example in FIG. 16 and assume that CMR pair 1 (i.e., the pair that includes CMR1 & CMR4) is indicated to the WD 22 for NC-JT CSI measurement. Then, according to this embodiment, if the higher layer parameter is configured, the WD 22 only measure single-TRP CSI measurement hypothesis on the CMR pair 1 indicated for NC-JT CSI measurement hypothesis. That is, the WD 22 may only use CMR 1 and CMR4 for single TRP CSI measurement. If the higher layer parameter is not configured, then the WD 22 may use all the CMRs configured in the CSI-RS resource set for single TRP CSI measurement. In some embodiments, the higher layer parameter is configured either in CSI-ReportConfig, or in CSI-AssociatedReport-ConfigInfo configured per CSI-AperiodicTriggerState in the CSI-AperiodicTriggerStateList information element in 3GPP TS 38.331.

In one embodiment, the indication of which CMRs that should be included for NC-JT measurement hypotheses are explicitly indicated by including pairs of NZP CSI-RS resource IDs. One example of this embodiment is illustrated below, where a new field "ncjt-CMR-pairing" contains two lists ("cmr-pair-list-1" & "cmr-pair-list-2") of NZP CSI-RS resource IDs. Each CMR pair used for NC-JT CSI measurement hypotheses, contains of one NZP CSI-RS resource indicated in "cmr-pair-list-1" (where the NZP CSI-RS resource, in some embodiments, is from a first CMR group) and one NZP CSI-RS resource indicated in "cmr-pair-list-2" (where the NZP CSI-RS resource, in some embodiments, from a second CMR group) The first NZP CSI-RS resource ID in each list may create a first CMR pair used for NC-JT CSI measurement hypothesis, and the second NZP CSI-RS resource ID of each list creates a second CMR pair.

The following is an example of RRC configuration of a new field explicitly pairing NZP CSI-RS resources for NC-JT CSI measurement hypothesis used for NC-JT CSI reporting.

```
--- ASN1START
-- TAG-CSI-REPORTCONFIG-START
CSI-ReportConfig ::=            SEQUENCE {
    reportConfigId             CSI-ReportConfigId,
    carrier              ServCellIndex     OPTIONAL,   -- Need
S
    resourcesForChannelMeasurement         CSI-ResourceConfigId,
    csi-IM-ResourcesForInterference        CSI-ResourceConfigId
OPTIONAL,   -- Need R
    [...]
    },
        ncjt-CMR-pairing
        SEQUENCE{
        cmr-pair-list-1                            SEQUENCE
(SIZE (1..maxNrofNcjtPairs)) OF NZP-CSI-RS-ResourceId
            cmr-pair-list-2
SEQUENCE (SIZE (1..maxNrofNcjtPairs)) OF NZP-CSI-RS-ResourceId
        },
```

In one alternate of this embodiment, instead of using explicit NZP CSI-RS resource IDs in the lists, a local codepoint or a local ID from within the respective CMR groups is used to point to a NZP CSI-RS resource within the NZP CSI-RS resource set used for channel measurement. If it is assumed that the maximum number of CMRs in one CMR group is 8 NZP CSI-RS resources for a NZP CSI-RS resource set used for NC-JT CSI reporting, then the number of bits used to indicate a NZP CSI-RS resource in each entry of each of the two lists only is 3 bits, which is smaller than the number of bits needed to indicate an explicit CSI-RS resource ID. The local order of NZP CSI-RS resources in a CMR group can be based on the CSI-RS resource ID, such that the NZP CSI-RS resource with lowest CSI-RS resource ID in a certain CMR group is associated with the lowest codepoint, the NZP CSI-RS resource with second lowest CSI-RS resource ID in the same CMR group is associated with the second lowest codepoint and so on. Alternatively, the local order of NZP CSI-RS resources in a CMR group is according to the order in the corresponding NZP CSI-RS resource set.

In another embodiment, a set of NC-JT CMR pairs are configured explicitly in either CSI-reportConfig or in CSI-AperiodicTriggerState. For each pair, a pair of NZP CSI-RS resource indices is indicated as $(CRI_i, CRI_j)$, $i \neq j$; $i,j=0, 1, \ldots, K_s-1$, where $CRI_k$ is the $k^{th}$ NZP CSI-RS resource in the NZP CSI-RS resource set and $K_s$ is the number of NZP CSI-RS resources in the NZP CSI-RS resource set. Alternatively, the indexing can be per CMR group, i.e., $$\left(CRI_i^0, CRI_j^1\right), i = 0, 1, \ldots, K_{s1} - 1; j = 0, 1 \ldots, K_{s2}, \text{ where } CRI_i^0, CRI_j^1$$

are $i^{th}$ and $j^{th}$ NZP CSI-RS resources in CMR groups 0 and 1, respectively, and Ks1 and Ks2 are the number of NZP CSI-RS resources in CMR groups 0 and 1, respectively. An example of configuring a set of NC-JT CMR resource pairs in CSI-AperiodicTriggerState is shown below, where maxN-rofNcjtHypothesis is the number of NC-JT hypothesis configured based on WD 22 capability.

The following is an example of configuring a set of NC-JT CMR resource pairs.

```
-- ASN1START
-- TAG-CSI-APERIODICTRIGGERSTATELIST-START
CSI-AperiodicTriggerStateList ::=             SEQUENCE (SIZE
        (1..maxNrOfCSI-AperiodicTriggers)) OF CSI-
        AperiodicTriggerState
CSI-AperiodicTriggerState ::=            SEQUENCE {
    associatedReportConfigInfoList              SEQUENCE
        (SIZE(1..maxNrofReportConfigPerAperiodicTrigger)) OF
        CSI-AssociatedReportConfigInfo,
    [...]
            ncjt-ResourceSet                          SEQUENCE {
        SIZE (1..maxNrofNcjtHypothesis)) OF Ncjt-
        ResourcePair
            Nejt-ResourcePair                        SEQUENCE {
cmr-group0-CRI-Id
            CMR-group0-CRI-Id
cmr-group1-CRI-Id
            CMR-group1-CRI-Id
            }
        CMR-group0-CRI-Id
        INTEGER (0..maxNrofCRIs-1)
        CMR-group1-CRI-Id
        INTEGER (0..maxNrofCRIs-1)
```

-continued

```
      },
         csi-SSB-ResourceSet                    INTEGER (1..maxNrofCSI-SSB-
            ResourceSetsPerConfig)
      }, [...]
   -- TAG-CSI-APERIODICTRIGGERSTATELIST-STOP
   -- ASN1STOP
```

In one embodiment, the WD 22 is configured with a list of possible NC-JT CSI measurement hypothesis like described in one of the above embodiments. In one example, if it is assumed that the maximum number of NZP CSI-RS resources in a CSI-RS resource set used for NC-JT CSI is equal to 8, then the maximum number of candidate NC-JT CSI measurement hypotheses would be k1*k2=4*4=16, where k1 is the number of NZP CSI-RS resources in CMR group 0 and k2 is the number of NZP CSI-RS resources in CMR group 1. Note that if all NC-JT CSI measurement hypotheses are known, then they can be fixed in the specification and no RRC configuration is needed. However, computing CSI for all NC-JT CSI measurement hypothesis will be a huge burden for the WD 22. A more practical solution is to RRC configure only a finite number of CMR pairs for a finite number of NC-JT CSI measurement hypotheses and have MAC CE further downselect one or a subset of the configured CMR pairs.

Consider the following example where a CSI report setting for NC-JT CSI is configured with a NZP CSI-RS resource set for channel measurement with 5 NZP CSI-RS resources (i.e., 5 CMRs). Further assume that the CMRs are divided into two CMR groups, with three CMRs in CMR group 0 and 2 CMRs in CMR group 1. Since each NC-JT CSI measurement hypothesis should consist of one CMR from each CMR group, there are 6 possible NC-JT measurement hypotheses for this NZP CSI-RS resource set. The corresponding CMR pairs for these 6 possible NC-JT CSI measurement hypotheses are CMR1-CMR4, CMR1-CMR5, CMR2-CMR4, CMR2-CMR5, CMR3-CMR4, and CMR3-CMR5.

In one embodiment, the MAC CE has a field that is a bit string where each bit indicates one of the possible NC-JT CSI measurement hypotheses. In other words, each bit in the field indicates one of the CMR pairs corresponding to one of the possible NC-JT CSI measurement hypotheses. Using the example above, the field in the MAC CE may consist of 6 bits [S0 S1 S2 S3 S4 S5] where the mapping of the bits to the CMR pairs may, for example, be given as follows:

bit S0 corresponds to CMR pair CMR1-CMR4;
   bit S1 corresponds to CMR pair CMR1-CMR5;
   bit S2 corresponds to CMR pair CMR2-CMR4;
   bit S3 corresponds to CMR pair CMR2-CMR5;
   bit S4 corresponds to CMR pair CMR3-CMR4; and/or
   bit S5 corresponds to CMR pair CMR3-CMR5.

In a given MAC CE, in some embodiments, the WD 22 may be indicated with one of the CMR pairs (e.g., one of the 6 bits in the above example set to 1 while the other 5 bits are set to 0). In this case, the WD 22 measures the CMR pairs, computes CSI and reports NC-JT CSI corresponding to the indicated CMR pair.

In some other embodiments, the WD 22 may be indicated with more than one CMR pair (e.g., two or more of the 6 bits in the above example set to 1). In this case, the WD 22 measures the indicated multiple CMR pairs, computes CSI and only reports the NC-JT CSI corresponding to one of the CMR pairs. The NC-JT CSI to be reported is determined by the WD 22 as the NC-JT CSI that gives the best throughput among the NC-JT hypotheses corresponding to the indicated multiple CMR pairs.

An example MAC CE for a first example that can indicate to the WD 22 which NC-JT hypothesis to consider can be given as below. In this example, assume a fixed list of 16 NC-JT CSI hypotheses. Despite the list of NC-JT CSI measurement hypotheses being indicated in MAC CE, the same principles as covered in the other embodiments above also apply to this embodiment. The fields in this MAC CE may be given as follows:

Serving Cell ID: This field indicates the identity of the Serving Cell for which the MAC CE applies;

BWP ID: This field indicates a UL BWP for which the MAC CE applies;

CSI report config ID: This field indicates the ID of the CSI report configuration for which the NC-JT CSI measurement hypothesis (or hypotheses) are being indicated;

Si: This field indicates the selection status of the NC-JT CSI measurement hypothesis (e.g., if possible, NC-JT CSI measurement hypothesis List is specified in TS 38.331, then S0 refers to the first NC-JT CSI measurement hypothesis within the list, S1 refers to the second NC-JT CSI measurement hypothesis within the list, and so on); and/or R: Reserved bit, set to 0.

In an alternative variant of the above embodiment, the NZP CSI-RS resource set ID for the CMR pairs to be used for NC-JT CSI measurements may be signaled instead of the CSI report config ID. Note that although 16 bits are shown in the Si field above, the number of bits in the Si field may depend on the maximum number of NC-JT CSI measurement hypothesis. Table 1 below shows another example MAC CE where the Si field has 6 bits which corresponds to 6 different NC-JT CSI measurement hypotheses. In some embodiments, the maximum number of NC-JT CSI measurement hypothesis may be predefined in 3GPP specifications.

TABLE 1

| R | | Service Cell ID (5 bits) | | | | BWP ID (2 bits) | | OCT 1 |
|---|---|---|---|---|---|---|---|---|
| R | R | | | CSI report config ID | | | | OCT 2 |
| $S_0$ | $S_1$ | $S_2$ | $S_3$ | $S_4$ | $S_5$ | $S_6$ | $S_7$ | OCT 3 |
| $S_8$ | $S_9$ | $S_{10}$ | $S_{11}$ | $S_{12}$ | $S_{13}$ | $S_{14}$ | $S_{15}$ | OCT 4 |

In an alternative variant of the above embodiment, the NZP CSI-RS resource set ID where the CMR pairs to be used for NC-JT CSI measurements are configured may be signaled instead of the CSI report config ID. Note that although 16 bits are shown in the Si field above, the number of bits in the Si field may depend on the maximum number of NC-JT CSI measurement hypothesis. Table 2 shows another example MAC CE where the Si field has 6 bits which corresponds to 6 different NC-JT CSI measurement hypotheses.

US 12,700,903 B2

31

TABLE 2

| R | | Service Cell ID (5 bits) | | | | BWP ID (2 bits) | | OCT 1 |
|---|---|---|---|---|---|---|---|---|
| R | R | | | CSI report Config ID | | | | OCT 2 |
| S₀ | S₁ | S₂ | S₃ | S₄ | S₅ | R | R | OCT 3 |

Note that the MAC CE for indicating the CMR pairs above can be an independent MAC CE different from the MAC CE used for activating semi persistent CSI-RS resources which is given in clause 6.1.3.12 of 3GPP TS 38.321 V16.3.0.

In an alternative embodiment, the Si field for indicating the NC-JT CSI measurement hypothesis to the WD 22 can be provided as part of the MAC CE for activating semi-persistent CSI-RS resources given in clause 6.1.3.12 of 3GPP TS 38.321 V16.3.0.

In yet another alternative embodiment, the Si field for indicating the NC-JT CSI measurement hypothesis to the WD 22 can be provided as part of the MAC CE for activating semi-persistent CSI reporting on PUCCH given in clause 6.1.3.16 of 3GPP TS 38.321 V16.3.0.

In yet another alternative, the Si field for indicating the NC-JT CSI measurement hypothesis to the WD 22 can be provided as part of the 'Aperiodic CSI Trigger State Sub-selection MAC CE' given in clause 6.1.3.13 of 3GPP TS 38.321 V16.3.0. In this embodiment, the CMR pairs corresponding to the NC-JT CSI measurement hypothesis to be indicated are indicated per each selected aperiodic CSI trigger state.

In some embodiments, the MAC CE can optionally be without the BWP ID.

In another embodiment, instead of indicating the Si fields in the MAC CE, each CMR pair corresponding to the NC-JT CSI measurement hypothesis to be indicated to the WD 22 is indicated via a pair of NZP CSI-RS resource IDs in the MAC CE.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node configured to communicate with a wireless device, WD, the method comprising:

transmitting a first indication indicating to the WD a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP;

transmitting a second indication indicating to the WD a first subset of CMRs for non-coherent joint transmission, NC-JT, CSI measurement hypotheses from the set of CMRs to use for determining the first CSI;

indicating that at least one channel measurement resource, CMR, of the first subset of CMRs used for NC-JT CSI measurement hypotheses is to be reused in a second subset of CMRs used for single-TRP measurement hypotheses;

and receiving a CSI report comprising at least one of the first CSI and the at least one second CSI.

2. The method of claim 1, wherein the second indication is a radio resource control, RRC, parameter that is included in a CSI-ReportConfig information element, IE.

3. The method of claim, 2, wherein, when the RRC parameter is not configured to the WD, the CMRs of the first subset of CMRs are not reusable in the second subset of CMRs.

4. The method of claim 2, wherein, when the RRC parameter is configured, the CMRs of the first subset are reusable in the second subset of CMRs.

5. The method of claim 2, wherein, when the RRC parameter is not configured, the CMRs in the first subset are not reusable in the second subset of CMRs.

6. The method of claim 1, wherein the second subset of CMRs partially overlaps with the first subset of CMRs.

7. The method of claim 1, wherein configuring the WD includes indicating that only CMRs from the first subset of CMRs are to be used in the second subset of CMRs.

8. The method of claim 1, wherein the second indication explicitly indicates the first subset of CMRs, the explicit indication including indication of pairs of non-zero power, NZP, CSI reference signal resource IDs.

9. The method of method of claim 1, wherein the second indication indicates the first subset of CMRs via a downlink control information, DCI, message.

10. The method of claim 9, wherein the first subset of CMRs is indicated in a CSI-AssociatedReportConfigInfo information element triggered by a CSI Request field in the DCI message.

11. The method of claim 1, wherein the second indication includes indicating the first subset of CMRs via a medium access control control element, MAC CE, message.

12. A method in a wireless device, WD, configured to communicate with a network node, the method comprising:

receiving a first indication of a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP;

receiving a second indication of a first subset of CMRs for non-coherent joint transmission, NC-JT, CSI measurement hypotheses from the set of CMRs to use for determining the first CSI;

the WD is indicated or configured that at least one CMR of the first subset of CMRs used for NC-JT CSI measurement hypotheses is to be reused in a second subset of CMRs used for single-TRP measurement hypotheses;

determining the at least one second CSI using the second subset of CMRs used for single-TRP measurement hypotheses from the set of CMRs; and transmitting a CSI report comprising at least one of the first CSI and the at least one second CSI.

13. The method of claim 12, wherein the second indication is a radio resource control, RRC, parameter that is included in a CSI-ReportConfig information element, IE.

14. The method of claim 13, wherein, when the RRC parameter is not configured to the WD, the CMRs of the first subset of CMRs are not reusable in the second subset of CMRs.

15. The method of claim 13, wherein, when the RRC parameter is configured, the CMRs of the first subset of CMRs are reusable in the second subset of CMRs.

16. The method of claim 13, wherein, when the RRC parameter is not configured, the CMRs in the first subset of CMRs are not reusable in the second subset of CMRs.

17. The method of claim 12, wherein at least one CMR of the first subset of CMRs is to be reused in the second subset of CMRs.

18. The method of claim 12, wherein the second subset of CMRs partially overlaps with the first subset of CMRs.

19. The method of claim 12, wherein only CMRs from the first subset of CMRs are used in the second subset of CMRs.

20. A WD configured to communicate with a network node, the WD comprising:

a radio interface configured to cause the WD to:

receive a first indication of a set of channel measurement resources, CMRs, to use for determining channel state information, CSI, the CSI including at least one of (i) a first CSI for multiple transmission and reception point, multi-TRP, physical downlink shared channel, PDSCH, transmission, and (ii) at least one second CSI for PDSCH transmission from one TRP; and receive a second indication of a first subset of for non-coherent joint transmission, NC-JT, CSI measurement hypotheses from the set of CMRs to use for determining the first CSI;

the WD being indicated or configured that at least one CMR of the first subset of CMRs used for NC-JT CSI measurement hypotheses is to be reused in a second subset of CMRs used for single-TRP measurement hypotheses; and determining the at least one second CSI using the second subset of CMRs used for single-TRP measurement hypotheses from the set of CMRs; and transmit a CSI report comprising at least one of the first CSI and the at least one second CSI.

* * * * *